(12) United States Patent
Shian et al.

(10) Patent No.: US 9,703,019 B2
(45) Date of Patent: Jul. 11, 2017

(54) ADAPTIVE OPTIC AND ACOUSTIC DEVICES

(71) Applicant: President and Fellows of Harvard College, Cambridge, MA (US)

(72) Inventors: Samuel Shian, Arlington, MA (US); Roger Diebold, Cambridge, MA (US); David Clarke, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/424,746

(22) PCT Filed: Aug. 28, 2013

(86) PCT No.: PCT/US2013/057133
§ 371 (c)(1),
(2) Date: Feb. 27, 2015

(87) PCT Pub. No.: WO2014/077931
PCT Pub. Date: May 22, 2014

(65) Prior Publication Data
US 2015/0241608 A1  Aug. 27, 2015

Related U.S. Application Data

(60) Provisional application No. 61/694,086, filed on Aug. 28, 2012.

(51) Int. Cl.
*G02B 1/06* (2006.01)
*G02B 3/12* (2006.01)
*G02B 3/14* (2006.01)

(52) U.S. Cl.
CPC ..................... *G02B 3/14* (2013.01)

(58) Field of Classification Search
CPC ........................................................ G02B 3/14
(Continued)

(56) References Cited

U.S. PATENT DOCUMENTS

| 7,929,218 B2 | 4/2011 | Mohr et al. |
| 9,335,539 B2 | 5/2016 | Shian et al. |

(Continued)

FOREIGN PATENT DOCUMENTS

| JP | 2009-186935 A | 8/2009 |
| WO | WO 2011/020013 A1 | 2/2011 |
| WO | WO 2011/150526 A1 | 12/2011 |

OTHER PUBLICATIONS

International Search Report and Written Opinion mailed Apr. 17, 2013 for Application No. PCT/US2013/022619.

(Continued)

*Primary Examiner* — Mahidere Sahle
(74) *Attorney, Agent, or Firm* — Wolf, Greenfield & Sacks, P.C.

(57) ABSTRACT

According to some aspects, an adaptive lens is provided. One such adaptive lens comprises at least one fluid-filled chamber located within an optical and/or acoustic path of the lens, and at least one elastomeric and substantially optically and/or acoustically transparent membrane, located within an optical and/or acoustic path of the lens and at least partially bounding one or more of the at least one fluid-filled chambers, wherein one or more of the at least one membranes is configured such that a shape of the membrane is altered upon receipt of an electric field. Some aspects provide a method of producing a lens comprising providing at least one chamber bounded at least in part by first and second membranes, and providing a fluid into the at least one chamber such that the fluid is located within an optical and/or acoustic path of the lens.

20 Claims, 16 Drawing Sheets

(58) Field of Classification Search
USPC ................................................ 359/665–667
See application file for complete search history.

(56)  References Cited

U.S. PATENT DOCUMENTS

| | | | |
|---|---|---|---|
| 2008/0144185 A1* | 6/2008 | Wang | G02B 3/14 |
| | | | 359/665 |
| 2008/0297880 A1 | 12/2008 | Steckl et al. | |
| 2009/0277056 A1 | 11/2009 | Peeters et al. | |
| 2009/0279158 A1 | 11/2009 | Peeters et al. | |
| 2010/0202054 A1* | 8/2010 | Niederer | G02B 3/14 |
| | | | 359/558 |
| 2010/0208328 A1 | 8/2010 | Heikenfeld et al. | |
| 2010/0249877 A1 | 9/2010 | Naughton | |
| 2011/0304905 A1 | 12/2011 | Yeo et al. | |
| 2012/0013967 A1 | 1/2012 | Kim | |
| 2013/0038944 A1* | 2/2013 | Chang | G02B 3/14 |
| | | | 359/666 |
| 2014/0355101 A1 | 12/2014 | Shian et al. | |

OTHER PUBLICATIONS

International Preliminary Report on Patentability mailed Aug. 7, 2014 for Application No. PCT/US2013/022619.
International Search Report and Written Opinion mailed May 1, 2014 for Application No. PCT/US2013/057133.
International Preliminary Report on Patentability mailed Mar. 12, 2015 for Application No. PCT/US2013/057133.

* cited by examiner

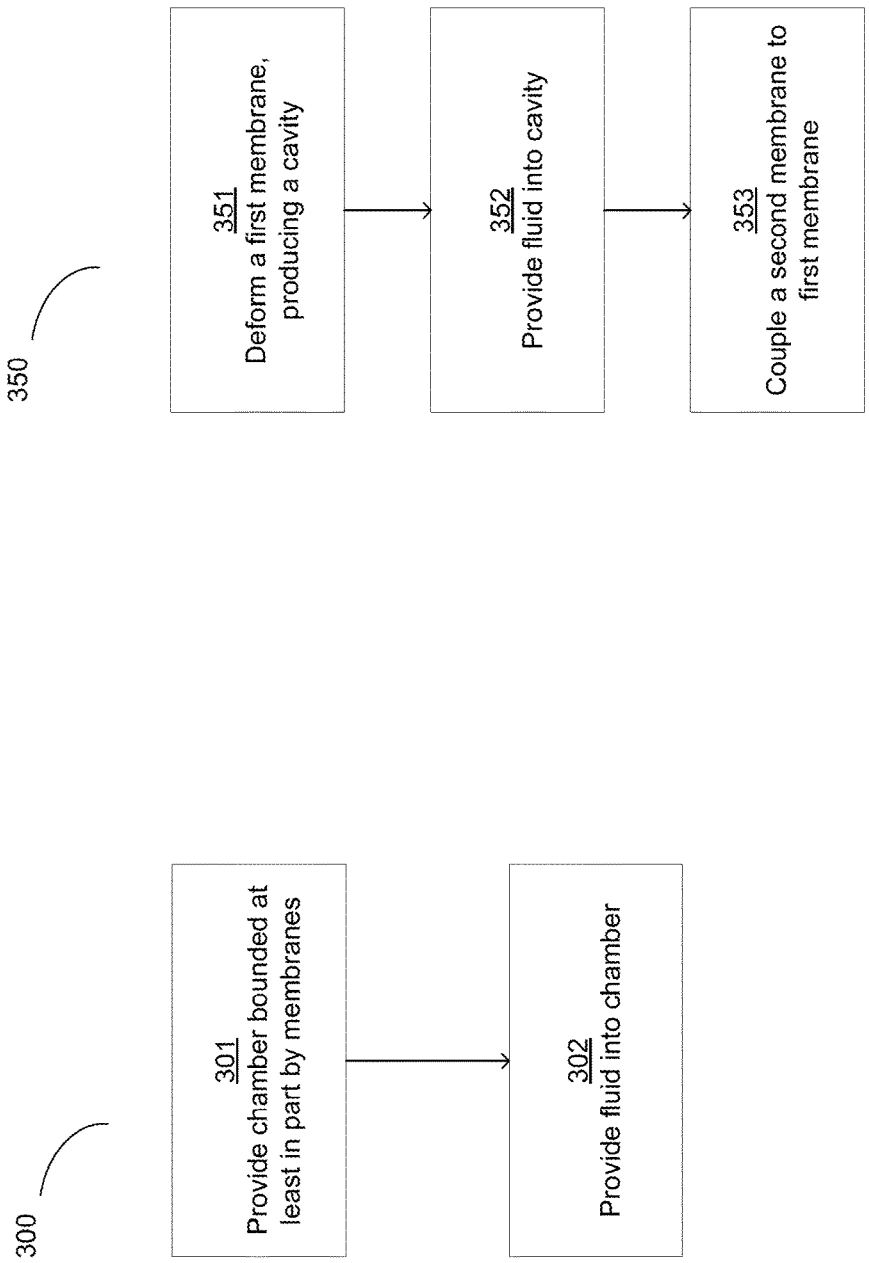

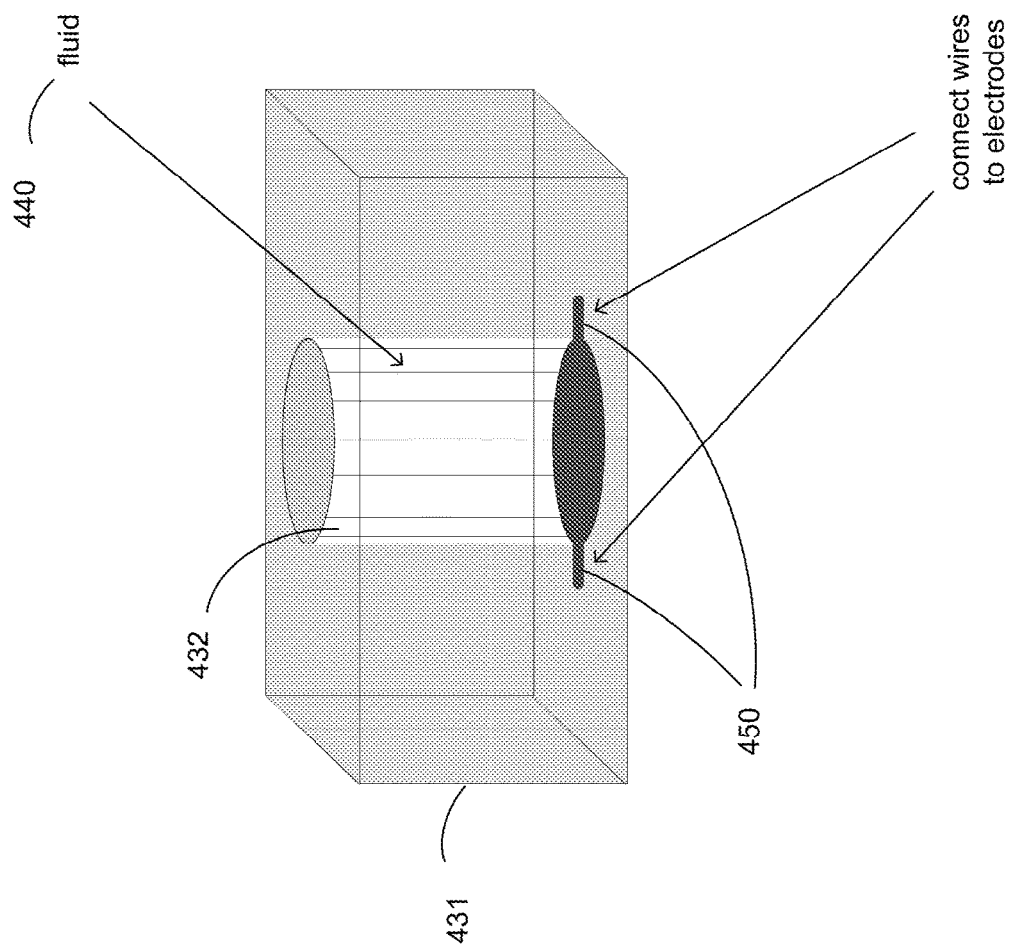

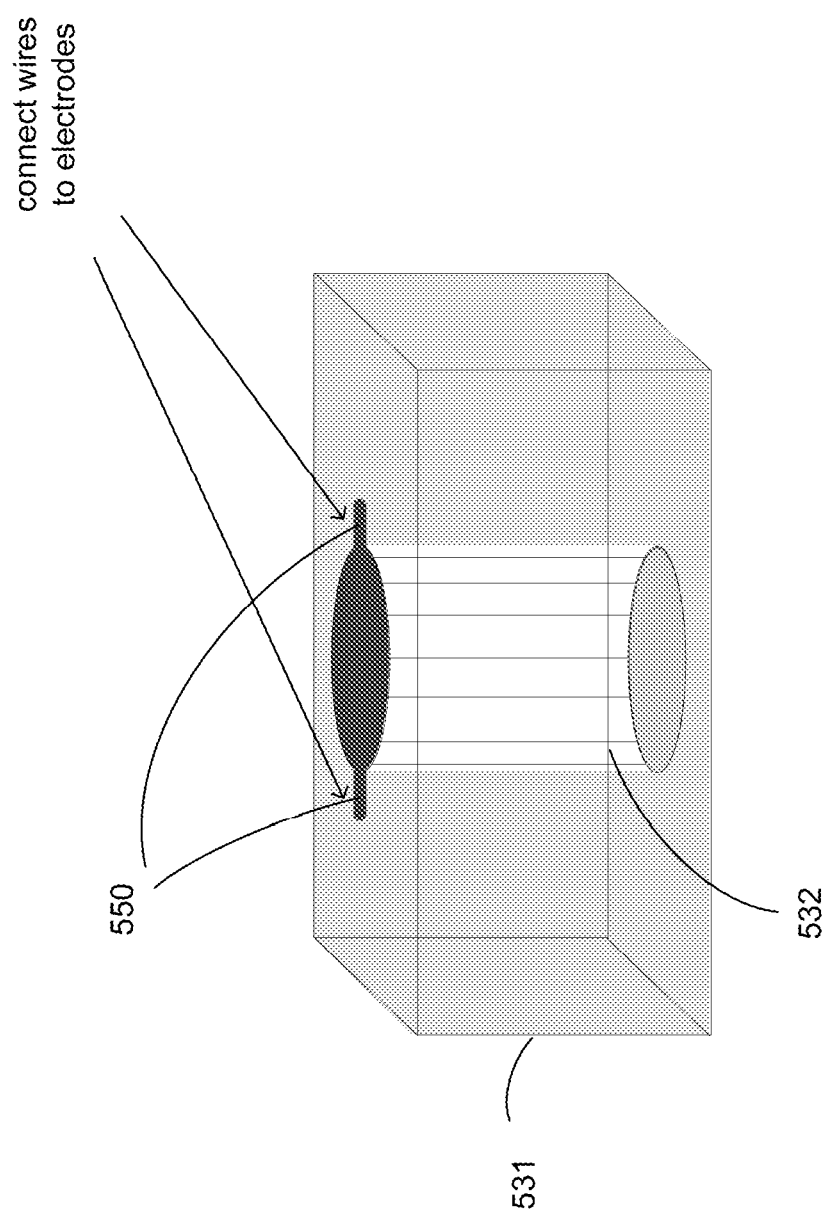

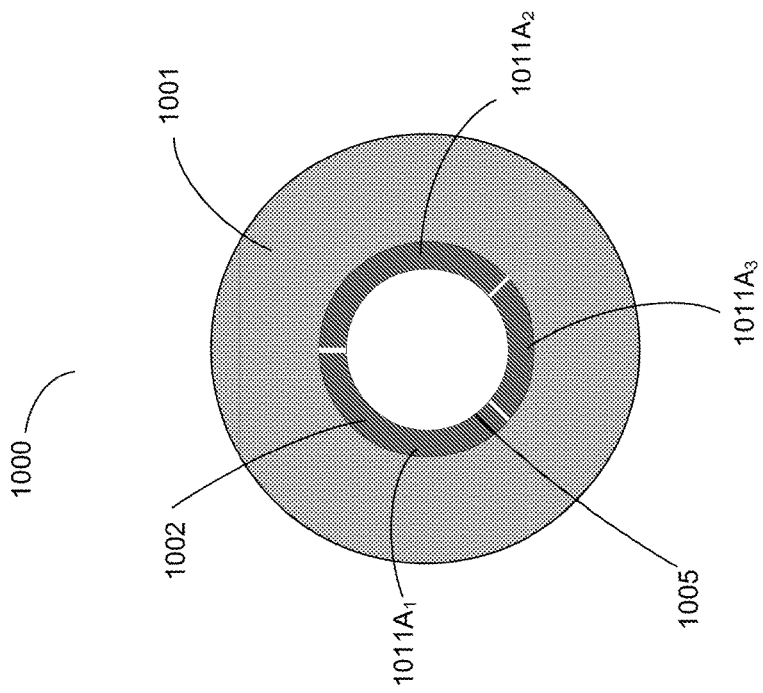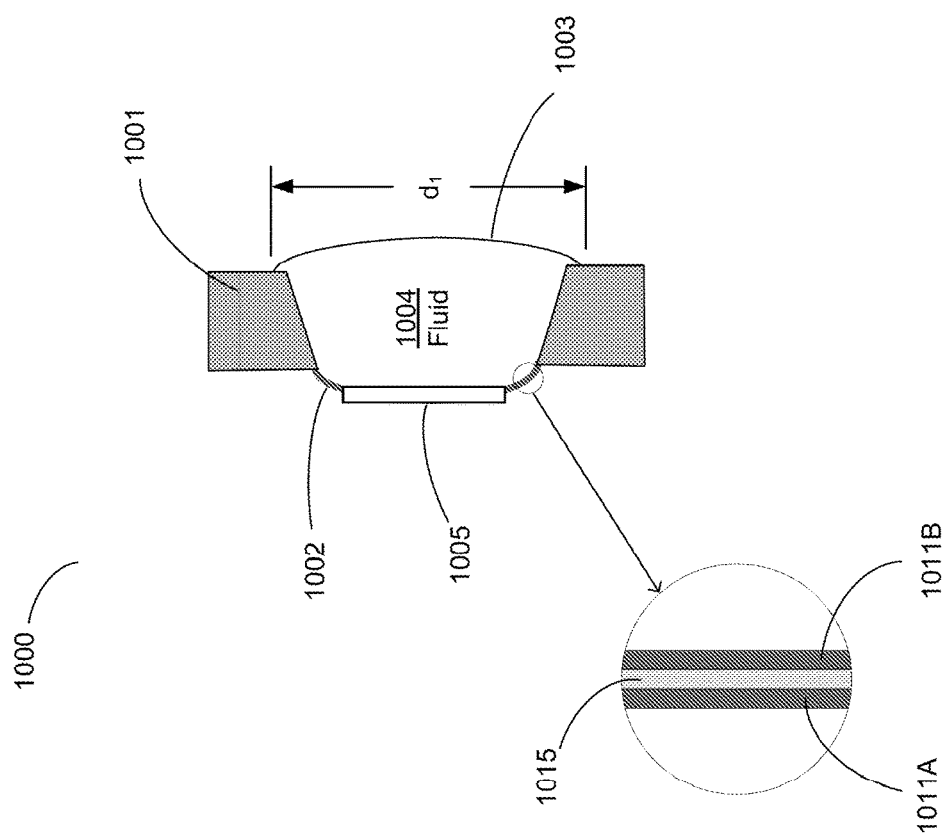
FIG. 10B
FIG. 10A

ADAPTIVE OPTIC AND ACOUSTIC DEVICES

RELATED APPLICATIONS

The present application claims the benefit of U.S. Provisional Patent Application No. 61/694,086, filed Aug. 28, 2012, titled "Tunable Optic and Acoustic Devices," which is hereby incorporated by reference in its entirety.

BACKGROUND

It may be beneficial for a device comprising a lens to adjust the path of incident optical and/or acoustic waves by adapting the properties of the lens. For example, in a conventional camera, a lens may be adjusted via a motor and gear assembly to allow the camera to focus on an object that is closer or further away from the camera. When the camera optics perform a zoom by narrowing or expanding the field of view, mechanical components in the camera assembly may move one or more lenses to cause the camera optics to properly focus the image captured by the camera.

Some lenses may utilize an anisotropic birefringent crystal to adjust optical and/or acoustic properties. For example, a liquid crystal has optical properties that may be adjusted by applying an electric field to the liquid. Thus, the properties of light and/or sound passing through the liquid may be modified. However, other properties, such as the polarization state of light, may also be modified in the process.

Some lenses may adapt optical and/or acoustic properties by moving a fluid within an electric field. For example, electrowetting techniques move an interface of hydrophilic and/or hydrophobic fluid droplets by applying an electric field to the droplets, thus moving one of the fluids towards or away from an optical path of a lens. However, the effectiveness of such an approach may be highly sensitive to the angle of light and/or sound incident upon the lens. Moreover, since the amount of force that may be applied to such droplets may be small, devices utilizing this technique may be limited to small lenses.

SUMMARY

Some embodiments provide an adaptive lens comprising at least one fluid-filled chamber located within an optical and/or acoustic path of the lens, and at least one elastomeric and substantially optically and/or acoustically transparent membrane, located within an optical and/or acoustic path of the lens and at least partially bounding one or more of the at least one fluid-filled chambers, wherein one or more of the at least one membranes is configured such that a shape of the membrane is altered upon receipt of an electric field.

Some embodiments provide an adaptive mirror comprising at least one fluid-filled chamber located within an optical and/or acoustic path of the minor, and at least one elastomeric and substantially optically and/or acoustically transparent membrane, located within an optical and/or acoustic path of the minor and at least partially bounding one or more of the at least one fluid-filled chambers, wherein one or more of the at least one membranes is configured such that a shape of the membrane is altered upon receipt of an electric field.

Some embodiments include a method of producing a lens comprising providing at least one chamber bounded at least in part by first and second membranes, and providing a fluid into the at least one chamber such that the fluid is located within an optical and/or acoustic path of the lens, wherein at least one of the first and second membranes is elastomeric, substantially optically and/or acoustically transparent, within an optical and/or acoustic path of the lens, and configured such that a shape of the membrane is altered upon receipt of an electric field.

Some embodiments include a method of producing a lens comprising deforming a first membrane such that a cavity is produced in the first membrane, providing a fluid into the cavity, coupling a second membrane to the first membrane, thereby forming a chamber comprising the fluid, wherein at least one of the first and second membranes is elastomeric, substantially optically and/or acoustically transparent, within an optical and/or acoustic path of the lens, and configured such that a shape of the membrane is altered upon receipt of an electric field.

The foregoing is a non-limiting summary of the invention, which is defined only by the appended claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A shows a first method of producing an adaptive lens, accordingly to some embodiments of the present invention;

FIG. 3B shows a second method of producing an adaptive lens, accordingly to some embodiments of the present invention;

FIGS. 4A-B depict a first exemplary manufacturing process of producing an adaptive lens, according to some embodiments of the present invention;

FIGS. 5A-B depict a second exemplary manufacturing process of producing an adaptive lens, according to some embodiments of the present invention;

FIGS. 10A-B illustrate an adaptive lens comprising a stiff circular member, according to some embodiments of the present invention;

DETAILED DESCRIPTION

Figure 1:
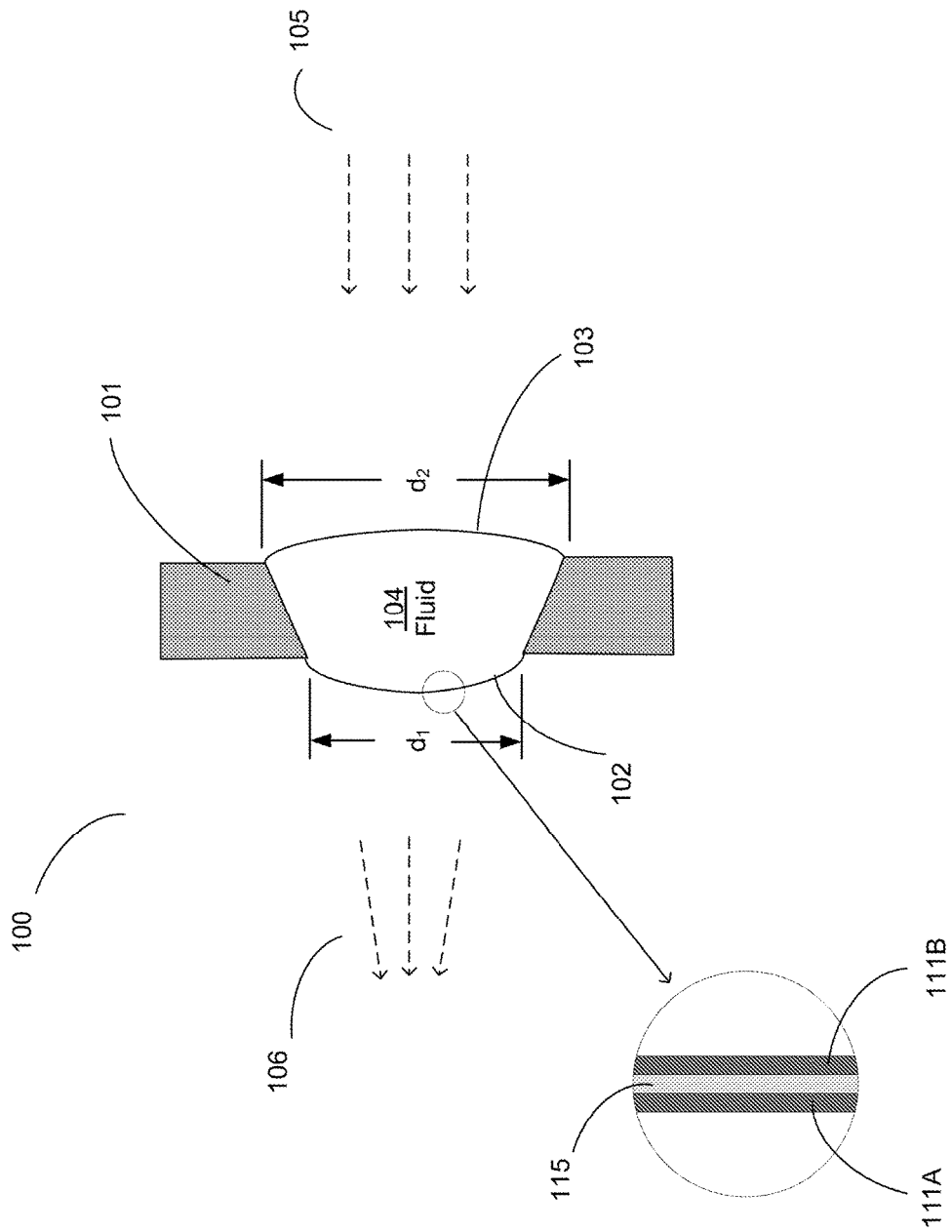
FIG. 1 illustrates a cross-sectional view of a convex adaptive lens, according to some embodiments of the present invention.

The inventors have recognized and appreciated that a compact adaptive lens having rapidly adjustable optical and/or acoustic properties may be formed from a fluid-filled transparent chamber at least partially bounded by one or more membranes whose shape may be altered by an electric field. By altering the shape of a membrane, the shape of the lens may be altered and thereby optical and/or acoustic properties of the lens may be adapted.

The inventors have further recognized and appreciated that a transparent membrane actuated via transparent electrodes may provide a lens with minimal components located outside the optical path of the lens, thereby resulting in a highly compact lens with high transmittance. For example, a pair of transparent membranes may enclose a fluid and one of the membranes may be actuated using an electric field. Due to the pressure of the fluid against the membranes, the shape of the lens may change such that optical and/or acoustic properties of the lens change also. By actuating the transparent membrane using a transparent electrode coupled to the transparent membrane, each component may be located within the optical path of the lens with minimal effect on the transmittance of light and/or sound through the lens.

The inventors have further recognized and appreciated that a fluid-filled lens comprising transparent membranes and transparent electrodes may be manufactured using low-cost materials and using simple methods. Conventional lenses are typically constructed by carefully machining and polishing glass, which may be an expensive and time-consuming process. In contrast, a transparent membrane may comprise inexpensive and/or common materials, such as silicones and/or acrylics, and may be constructed in a typical laboratory setting.

The inventors have further recognized and appreciated that a fluid-filled lens as described herein may be equally applied to both acoustic and optical applications since both sound and light may be refracted by a lens. In addition, by actuating a membrane of the lens in a suitable manner (e.g., using an oscillating electric field), acoustic waves may be generated by the lens. Moreover, by applying a metallic layer to the lens, an adaptive mirror may be formed.

By using membranes comprising materials whose shape may be greatly altered by an electric field, an adaptive lens may be formed that exhibits a very large range of optical properties. For example, changes in focal length of the lens up to 200% or more may be generated using a suitable material.

In some embodiments, the adaptive lens comprises a membrane comprising an electroactive polymer, which may be actuated by an electric field. For example, the materials known as dielectric elastomers produce large strains by sandwiching a passive elastomer film between two electrodes. By applying a voltage to the electrodes, a very large strain (e.g., up to 300%) may be generated in the elastomer film which effects a correspondingly large change to one or more optical and/or acoustic properties of the lens. Accordingly, an adaptive lens with a wide range of optical and/or acoustic properties may be formed at least in part from a membrane comprising a dielectric elastomer. Such a lens may exhibit a wide range of properties as a result of changes to the shape of the membrane produced by actuation of the dielectric elastomer.

In some embodiments, an adaptive lens may comprise multiple membranes and/or multiple fluid-filled chambers, which may produce an even greater range and/or types of optical and/or acoustic properties. For example, a lens comprising two fluid-filled chambers, which may or may not comprise the same type(s) of fluid(s), may be formed. The inventors have recognized and appreciated that a multiple chamber lens may reduce image distortion compared with a single chamber lens, which may be due to pressures of the fluids being self-compensating. Moreover, a multiple chamber lens may be configured to reduce chromatic and/or spherical aberrations within a single lens, for example by being configured as an achromatic doublet.

Since the electric field applied to an adaptive lens may be rapidly adjusted, the optical and/or acoustic properties of the lens may be similarly adjusted, so long as the material of the lens can respond quickly. Dielectric elastomers are characterized by fast response times, so their use may allow the adjustment of optical and/or acoustic properties of the lens within time scales of less than a second (e.g., between 0.01 and 0.2 seconds).

Techniques described herein may be applicable to use cases in which a compact, adaptive optical lens is desirable. For example, suitable applications for an adaptive optical lens include a medical endoscope, a cell phone camera, or an aerial drone. Aspects of the adaptive lens described herein may have low power consumption (e.g., less than 5 mW) making it suitable for mobile devices, and moreover may have rapid image response capabilities (e.g., quick focus adjustment) making the lens suitable for machine vision applications.

Techniques described herein may also be applicable to use cases in which a compact, adaptive acoustic lens is desirable. Conventional acoustic sources may need to be used in conjunction with an impedance matching material (e.g., a water-based gel in ultrasound), otherwise at least part of the sound may be reflected back at the interface between the materials. The inventors have recognized and appreciated that an adaptive lens may be constructed using materials that will result in acoustic waves being impedance matched against an intended target, minimizing the need for a secondary material to ensure transmission of sound into a target (although, in some embodiments it may still be beneficial to include such a secondary material). For example, a suitable lens may comprise a fluid having similar acoustic properties to water, allowing effective propagation of acoustic waves from the lens into, say, the human body without the addition of an impedance matching material.

Following below are more detailed descriptions of various concepts related to, and embodiments of, adaptive optic and acoustic devices. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates a cross-sectional view of a convex adaptive lens, according to some embodiments of the present invention. Lens 100 includes support 101, membranes 102 and 103, and fluid 104. Support 101 is a relatively stiff frame that supports membranes 102 and 103 and encloses fluid 104. Fluid 104 may have a constant volume. In the example of FIG. 1, the diameter of membrane 103 is larger than the diameter of membrane 102, which results in incoming light and/or sound waves 105 converging after passing through the lens (outgoing light and/or sound waves 106). By changing the shape of membrane 102, the shape of membrane 103 may also change due to pressure that fluid 104 applies to membrane 103. Accordingly, optical and/or acoustic properties of the lens may be altered. For example, the curvature of one or both of membranes 102 and 103 may be altered, changing the focal length of the lens.

Support 101 may comprise any suitable material, or combination of materials. In some embodiments, support 101 may be constructed from a sufficiently rigid material that can hold the membranes and does not suffer significant flexure under membrane tension (e.g., caused by pressure of fluid 104). Support 101 is not limited to be formed from a material of any particular transparency or opaqueness, though in some embodiments the support 101 comprises substantially transparent material. In some embodiments, support 101 may comprise polydimethylsiloxane (PDMS), including filled and/or cured PDMS.

Support 101 may have any suitable shape. In the example of FIG. 1, support 101 forms a block having an approximately circular opening in which fluid 104 is located. However, in general support 101 may have any suitable shape and/or dimension suitable to support membranes 102 and 103, and fluid 104. In some embodiments, support 101 is ring-shaped.

Membranes 102 and 103 may comprise any suitable material. In some embodiments, membrane 102 and/or membrane 103 comprise a material whose shape may be altered such that optical and/or acoustic properties of the lens may be affected due to the pressure exerted on the membranes by fluid 104. In some embodiments, membrane 102 and/or membrane 103 comprises an electroactive material, such as an electroactuating polymer, such that the shape and/or position of the corresponding membrane(s) may be modified via the application of an electric field.

Membranes 102 and 103 may be connected to support 101 using any suitable bonding technique. In some embodiments, membranes 102 and 103 are bonded to support 101 with an adhesive. For example, a suitable adhesive may be stable over a range of operating temperatures of lens 100 and/or may retain adhesion for a suitable duration of operation of the lens. However, membranes 102 and 103 may be connected to support 101 using any technique that provides a stable attachment of the respective elements, for example such that fluid 104 does not substantially leak out of support 101. In some embodiments, membranes 102 and/or 103 are connected to support 101 via one or more mechanical couplings, e.g., via clamps, clips and/or pins.

In the example of FIG. 1, membrane 102 comprises actuating elastomer membrane 115 positioned between electrodes 111A and 111B, as shown in the inset in FIG. 1 depicting a magnified section of membrane 102. The actuating elastomer membrane 115 may comprise any suitable material. In some embodiments, the actuating elastomer membrane 115 may be prepared from a highly transparent silicone sheet or any carbon-based elastomer that is sufficiently transparent. In some embodiments, the material may transmit >90% of light in the visible portion of the electromagnetic spectrum (e.g., 400-700 nm). Such membrane materials include, but are not limited to, PDMS, silicones, acrylics including acrylic elastomers (e.g., VHB 4905 and/or VHB 4910, each produced by 3M Company), polyurethane, and combinations thereof. In some embodiments, the actuating elastomer membrane 115 may comprise the same or similar material as membrane 103. In some embodiments, the refractive index of actuating elastomer membrane 115 is between 1.0 and 1.8, for example approximately 1.5.

Electrodes 111A and 111B may comprise any suitable material. In some embodiments, the electrodes 111A-B may be prepared from a highly transparent electrically conductive material that conducts electricity yet transmits >90% of light in the visible portion of the electromagnetic spectrum. As a non-limiting example, electrodes 111A-B may be constructed from carbon nanotubes, such as single-walled carbon nanotubes (SWCNT). However, any material having a high (e.g., greater than 80%) transmittance of visible light and the ability to conduct sufficient electricity to actuate the actuating elastomer membrane 115 may be used. In some embodiments, at least one of electrodes 111A and 111B comprises a SWCNT mat. Electrodes 111A and 111B may have any suitable thickness. In some embodiments, electrodes 111A and/or 111B have a thickness less than 300 nm, such as 50 nm.

Although not shown in FIG. 1, electrode 111A and/or electrode 111B may protrude into support 101, which may for example provide a coupling for an electrical connection. However, in general each of electrodes 111A-B may be of any suitable shape. Moreover, at least one of electrodes 111A-B may comprise multiple electrode areas that may be actuated separately, as will be described in further detail below in relation to FIG. 9A-B. Each of electrodes 111A and 111B may cover any fraction of the surface of the actuating elastomer membrane 115, including the entire surface. Moreover, electrodes 111A and 111B may, or may not be, of the same size, shape or structure.

Fluid 104 may be any suitable fluid, or combination of fluids. In some embodiments, fluid 104 is a non-permeable liquid that is highly transparent, chemically stable, and compatible with materials used in membranes 102 and 103 and the support 101 (i.e., does not react with, or cause to change shape). Light and/or sound waves passing through the lens may be refracted by fluid 104 due to the fluid having a refractive index different from the refractive index of a medium in which lens 100 is located. For example, the focal length of lens 100 may be approximated by:

$$\frac{1}{f} = \left(\frac{n_l}{n_m} - 1\right)\left(\frac{1}{R_1} - \frac{1}{R_2}\right)$$

wherein f is the resulting focal length of the lens, $n_l$ and $n_m$ are the refractive index of the lens (which may be approximately that of the fluid) and the medium in which lens 100 is located, and $R_1$ and $R_2$ are the radii of curvature of membranes 102 and 103, respectively. In some embodiments, the refractive index of fluid 104 is approximately the same as the refractive index of membrane 102 and/or membrane 103.

In some embodiments, fluid 104 is stable over an operating temperature range of lens 100. For example, fluid 104 exhibits a limited amount of thermal expansion and/or contraction over an operating temperature range of lens 100. Substantial thermal expansion of the fluid relative to membranes 102 and 103 may result in undesirable changes to the shape of the lens, and consequently a change to the optical and/or acoustic properties.

In some embodiments, fluid 104 comprises silicone oil. Fluid 104 may comprise any liquid comprising polymerized siloxane, with or without one or more organic side chains, including PDMS. For example, silicone oil may comprise varying amounts of phenyl groups in side chain(s), which may yield silicone oils with various refractive indexes based on the number of phenyl groups. As a non-limiting example, fluid 104 may comprise clear silicone oil PMX-200 as manufactured by Dow Corning Corporation. Any such silicone oil may be used, in whole or in part, in fluid 104. A fluid or any combination of fluids with any suitable refractive indices may be used as fluid 104, as the invention is not limited in this regard. For example, the refractive index of fluid 104 may be approximately 1.4; or fluid 104 may be a combination of fluids that, combined, have a refractive index of approximately 1.4.

Membrane 103 may comprise any suitable material, including those materials described above in relation to actuating elastomer membrane 115. In some embodiments, membrane 103 may be prepared from a highly transparent silicone sheet or any carbon-based elastomer that is sufficiently transparent. In some embodiments, the material may transmit >90% of light in the visible portion of the electromagnetic spectrum (e.g., 400-700 nm). Such membrane materials include, but are not limited to, PDMS, silicones, acrylics, polyurethane, acrylic elastomers (e.g., VHB 4905 and/or VHB 4910, each produced by 3M Company) or a combination thereof.

Electrodes 111A and/or electrode 111B may be configured to receive any suitable voltage to actuate the actuating elastomer membrane 115. In some embodiments, electrodes 111A and/or 111B are configured to receive a voltage between 300V and 10 kV, for example, 1.5 kV. The Coulombic attraction between electrodes 111A and 111B may generate a Maxwell stress within at least part of actuating elastomer membrane 115. Such stress may cause at least part of actuating elastomer membrane 115 to change its shape, which as described above may result in a change to one or more optical and/or acoustic properties of lens 100.

In some embodiments, actuating elastomer membrane 115 is configured to exhibit stress when no voltage is supplied to the electrodes 111A-B. In such embodiments, the strain may, for example, allow the modification of the shape of membrane 102 by increasing as well as decreasing the strain, thus providing a greater range of potential motion compared with a membrane not exhibiting strain (which may only be capable of having its strain increased). That is, it may not be possible to increase the stress of an actuating elastomer membrane that exhibited no stress when no voltage was supplied to electrodes in proximity to the membrane.

In some embodiments, actuating elastomer membrane 115 exhibits stress and thereby stores energy, which may for example be an energy between 1 μJ and 1 J, such as 0.4 mJ. Actuation of actuating elastomer membrane 115 may increase or decrease the energy stored in the membrane, for example by increasing or decreasing the stress exhibited by the membrane, respectively. Power consumption of the actuating elastomer membrane 115 may be between 1 μJ and 1 J during actuation. In some embodiments, the power consumption of the actuating elastomer membrane 115 is between 1 μW and 100 J, for example 0.1 mW.

An electric field may be applied to electrodes 111A-B via electrically conductive pathways provided in any suitable way. In some embodiments, conductive wires (not shown) within support 101 are connected to electrodes 111A and 111B and are connected to a power supply outside of the lens. Such conductive wires may be further coupled to support 101 to provide further stability of the connection, for example via adhesive (which may be at least partially elastomeric). As described above, at least one of electrodes 111A and 111B may protrude into support 101, which may aid attachment of said conductive wires to the electrodes.

In some embodiments, lens 100 has an optical transmittance of 550 nm light greater than 85%. In some embodiments, lens 100 is configured to exhibit a fractional change in focal length up to 200% by application of a voltage up to 5000V across electrodes 111A-B.

The example of FIG. 1 is provided as an exemplary embodiment and variations of the structure shown in FIG. 1 may be devised. For example, membrane 103 may be actuated in the same or a similar manner to membrane 102 by providing suitable electrodes to membrane 103. Actuating both membranes may provide a greater range of optical and/or acoustic properties and/or may allow for finer control of said properties. Furthermore, any number of membranes, both actuating and non-actuating, may be utilized in lens 100, some examples of which are discussed below.

Figure 2:
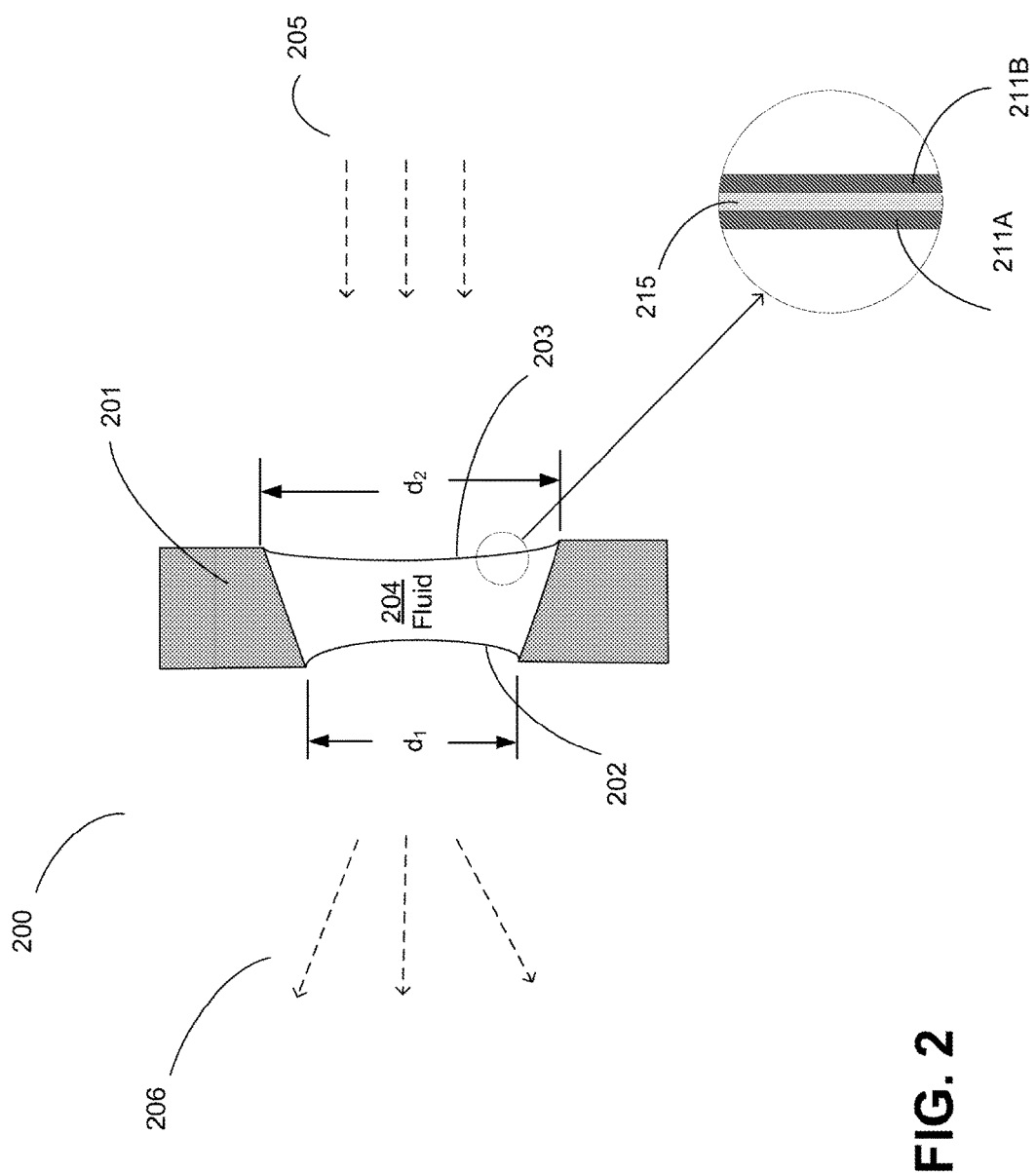
FIG. 2 illustrates a cross-sectional view of a concave adaptive lens, according to some embodiments of the present invention.

FIG. 2 illustrates a cross-sectional view of a concave adaptive lens, according to some embodiments of the present invention. Lens 200 includes support 201, membranes 202 and 203 and fluid 204. Support 201 is a relatively stiff frame that supports membranes 202 and 203, and encloses fluid 204, which may have a constant volume. In the example of FIG. 2, the diameter of membrane 203 is larger than the diameter of membrane 202 and the lens is concave, which results in incoming light and/or sound waves 205 diverging after passing through the lens (outgoing light and/or sound waves 206). By changing the shape of membrane 202, the shape of membrane 203 may be changed due to the pressure fluid 204 exerts on membranes 202 and 203. Accordingly, optical and/or acoustic properties of the lens may be altered. For example, the curvature of one or both of membranes 202 and 203 may be altered, changing the focal length of the lens.

Support 201 may comprise any suitable material having any suitable properties, including any material and/or properties indicated above in reference to support 101 shown in FIG. 1. Membranes 202 and 203 may comprise any suitable material having any suitable properties, including any materials and/or properties indicated above in reference to membranes 102 and/or 103 shown in FIG. 1. Electrodes 211A and 211B may comprise any suitable material having any suitable properties, including any material and/or properties indicated above in reference to electrodes 111A and/or 111B shown in FIG. 1. Actuating elastomer membrane 215 may comprise any suitable material having any suitable properties, including any material and/or properties indicated above in reference to actuating elastomer membrane 115 shown in FIG. 1.

Membranes 202 and 203 may be connected to support 201 using any suitable bonding technique. In some embodiments, membranes 202 and 203 are bonded to support 201 with an adhesive. For example, a suitable adhesive may be stable over a range of operating temperatures of lens 200 and/or may retain adhesion for a suitable duration of operation of the lens. However, membranes 202 and 203 may be connected to support 201 using any technique that provides a stable attachment of the respective elements, for example such that fluid 204 does not substantially leak out of support 201. In some embodiments, membranes 202 and/or 203 are connected to support 201 via one or more mechanical couplings, e.g., via clamps, clips and/or pins.

Fluid 204 may be any suitable fluid, or combination of fluids, including any fluid(s) having any properties indicated above in reference to fluid 104 shown in FIG. 1. In some embodiments, fluid 204 has a negative pressure (i.e., a pressure less than an ambient pressure) that may, for example, ensure that lens 200 is configured as a concave lens.

An electric field may be applied to electrodes 211A-B via electrically conductive pathways provided in any suitable way. In some embodiments, conductive wires (not shown) within support 201 are connected to electrodes 211A and 211B and are connected to a power supply outside of the lens. Such conductive wires may be further coupled to support 201 to provide further stability of the connection, for example via adhesive (which may be elastomeric). As described above, at least one of electrodes 211A and 211B may protrude into support 201, which may aid attachment of said conductive wires to the electrodes.

Each of electrodes 211A and 211B may cover any fraction of the surface of the actuating elastomer membrane 215, including the entire surface. Moreover, electrodes 211A and 211B may, or may not be, of the same size, shape or structure.

In some embodiments, lens 200 has an optical transmittance of 550 nm light greater than 85%. In some embodiments, lens 200 is configured to exhibit a fractional change in focal length up to 100% by application of a voltage up to 5000V across electrodes 211A-B.

The example of FIG. 2 is provided as an exemplary embodiment and variations of the structure shown in FIG. 2 may be devised. For example, membrane 203 may be actuated in the same or a similar manner to membrane 202 by providing suitable electrodes to membrane 203. Actuating both membranes may provide a greater range of optical and/or acoustic properties and/or may allow for finer control of said properties. Furthermore, any number of membranes, both actuating and non-actuating, may be utilized in lens 201, some examples of which are discussed below.

FIG. 3A shows a first method of producing an adaptive lens, accordingly to some embodiments of the present invention. Method 300 begins at act 301 wherein a chamber bounded at least in part by membranes is provided. The chamber may comprise any suitable closed volume, for example the volume occupied by fluid 104 in FIG. 1. Any number of membranes, including one membrane, may bound the chamber. In some embodiments, at least one of the membranes is configured such that a shape of the membrane is altered upon receipt of an electric field. The membranes may comprise any suitable material having any suitable properties, including any material and/or properties indicated above in reference to membranes 102 and/or 103 shown in FIG. 1.

The chamber in act 301 may be filled with any material, or may be evacuated. For example, the chamber may be filled with air. Act 301 is not limited as to any particular pressure of the contents of the chamber, nor as to strains exhibited by any one of the membranes, though in some embodiments at least one membrane exhibits shear strain between 0% and 300%, such as around 100%. A chamber bounded by one or more membranes having strain may, for example, allow the modification of the shape of a membrane by increasing as well as decreasing the strain, thus providing a greater range of potential motion compared with a membrane not exhibiting strain (which may only be capable of having its strain increased).

In act 302, fluid is provided into the chamber. The fluid may be provided using any suitable technique. As one non-limiting example, the fluid may be provided by injecting fluid into the chamber using a syringe. Act 302 is not limited to the fluid being provided directly into the chamber, and may for example include fluid being provided to the chamber via another element, for example via a capillary tube. The provided fluid may be any suitable fluid, or combination of fluids, for use in an adaptive lens, including any fluid(s) identified above in discussion of fluid 104 shown in FIG. 1.

In some embodiments, method 300 is used to produce lens 100 shown in FIG. 1 and/or lens 200 shown in FIG. 2. For example, support 101 may be coupled to membranes 102 and 103 creating a chamber bounded by the membranes. Fluid 104 may then be introduced into the chamber to create lens 101. In some embodiments, a concave lens, such as lens 200, is produced by removing fluid after the fluid is provided in act 302, in order to create negative pressure inside the chamber.

FIG. 3B shows a second method of producing an adaptive lens, accordingly to some embodiments of the present invention. By deforming a first membrane, method 350 may be used to produce an adaptive lens containing a fluid having a pressure greater than an ambient pressure.

Method 350 begins at act 351 wherein a first membrane is deformed, producing a cavity. The first membrane may comprise any suitable material having any suitable properties, including any material and/or properties indicated above in reference to membranes 102 and/or 103 shown in FIG. 1. Moreover, the membrane may be deformed via any suitable method, including via use of a vacuum. The cavity produced in act 351 may be of any shape and size suitable for producing an adaptive lens. In some embodiments, the first membrane is attached to a frame structure during deformation in act 351.

In act 352, a fluid is provided into the cavity produced in act 351. The fluid may be provided using any suitable technique. As non-limiting examples, the fluid may be provided by injecting fluid into the cavity using a syringe, may be poured into the cavity, may be dropped into the cavity (e.g., via a pipette), or combinations thereof. The provided fluid may be any suitable fluid, or combination of fluids, for use in an adaptive lens, including any fluid(s) identified above in discussion of fluid 104 shown in FIG. 1.

In some embodiments, the deformation of the first membrane is sustained during act 351 such that the cavity remains present during addition of the fluid. In such embodiments, the deformation applied during act 352 may be the same or substantially the same as the deformation technique applied during act 351, though may alternatively be a different technique used to sustain the deformation. As an example of the latter approach, a vacuum may be used to deform the first membrane, which may be attached to a frame in its deformed state and the vacuum removed prior to addition of the fluid.

In act 353, a second membrane is coupled to the first membrane. In some embodiments, the second membrane is directly coupled to the first membrane such that a portion of the first membrane contacts the second membrane. In some embodiments, the second membrane is indirectly coupled to the first membrane, such that the second membrane contacts a structure to which the first membrane contacts (e.g., a support structure). Irrespective of the type of coupling, the coupling of the second membrane creates a closed chamber in which at least part of the fluid is located, thus producing an adaptive lens. In some embodiments, the first membrane is attached to a support structure and the second membrane is also attached to the support structure such that the three elements create a closed chamber containing the fluid. Such an embodiment may produce, for example, lens 100 in FIG. 1.

Method 350 may be particularly applicable to use cases in which a large number of adaptive lenses are created, since the step of providing the fluid may be quicker in act 352 than, for example, the providing in act 302 to a closed chamber. However, method 350 may in general be applied to any suitable use case.

Figure 4A:
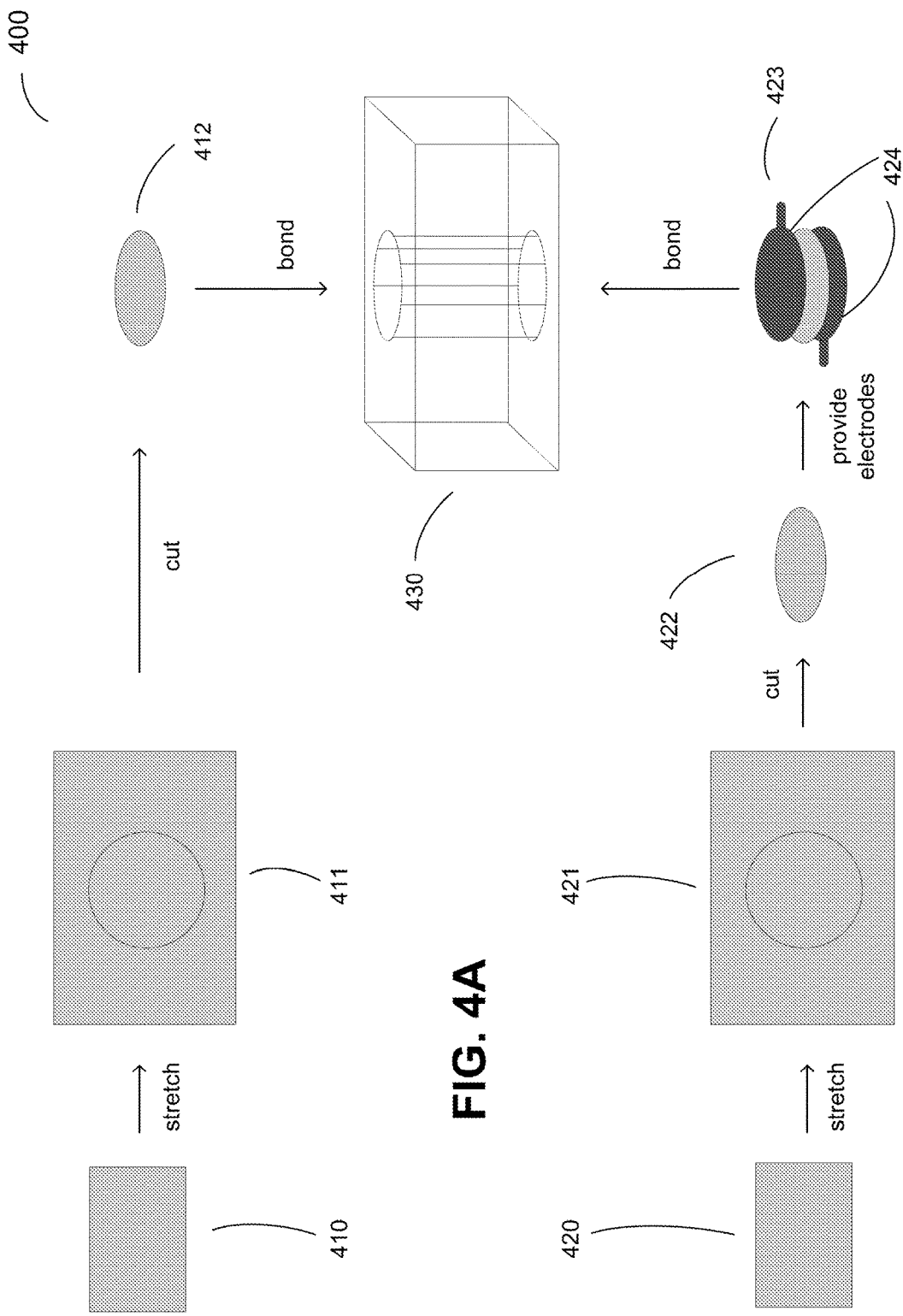

FIGS. 4A-B depict a first exemplary manufacturing process of producing an adaptive lens, according to some embodiments of the present invention. Process 400 is depicted as a series of steps identified with arrows, the details of which are described below.

As an overview, a first membrane is produced from a sheet of a suitable material 410 that is stretched to produce stretched sheet 411 and then cut to produce membrane 412. In addition, a second membrane is produced from a sheet of a suitable material 420 that is stretched to produce sheet 421 and then cut to produce membrane 422. Electrodes are provided to membrane 422 to produce actuating membrane 423. Membrane 412 and actuating membrane 423 are bonded to support structure 430 and a fluid is provided to chamber 432 (shown in FIG. 4B) to produce an adaptive lens. The process depicted in FIGS. 4A-B may be suitable, for example, to produce lens 100 shown in FIG. 1 and/or lens 200 shown in FIG. 2.

Sheet 410 may comprise any suitable material, including those materials identified above in relation to membranes 102 and 103 in FIG. 1. In some embodiments, sheet 410 comprises PDMS. A PDMS sheet may be prepared in any suitable manner, including by dissolving precursor components of the PDMS material (e.g., elastomer and curing agent) individually in an organic solvent (e.g., xylenes), mixing the solvated precursor components and casting the mixture onto a release liner. The PDMS may then be temperature cured, for example at 50-100° C. for between 10 minutes and 5 hours, where the length of the curing time may depend on the thickness of the sheet. In some embodiments, the PDMS is 50 microns thick and is cured at 70° C. for 1 hour.

Sheet 410 is stretched to form stretched sheet 411. The stretching may be achieved using any suitable technique, including mechanically exerting forces at the periphery of the sheet. In some embodiments, a stiff material (e.g., polyethylene) may be attached to the periphery of sheet 410 and a moveable apparatus coupled to the stiff material. The moveable apparatus may be used to apply a displacement to the stiff material and thereby cause a strain to be generated in the sheet in a direction approximately biaxial to the central region of the sheet. However, in general any method that produces a suitable strain in sheet 410, such that the sheet increases in surface area, may be used. In some embodiments, sheet 410 is stretched in at least one direction between 100% and 300%, for example 200% in both x and y directions within the plane of the sheet. Although FIG. 4A depicts both sheet 410 and stretched sheet 411 as approximately flat, there is no requirement that either is flat, as the invention is not limited in this regard. As a non-limiting example, sheet 410 may be stretched across a curved surface to produce stretched sheet 411.

Stretched sheet 411 is cut to produce membrane 412. Any suitable technique may be used to cut the stretched sheet that retains some or all of the strain produced during stretching within membrane 412. In some embodiments, rigid structures are applied to either side of the stretched sheet 411 to constrain a region of the stretched sheet, and the area of the stretched sheet around the rigid structures is cut away. For example, rigid plastic rings may be applied on either side of the stretched sheet. The plastic rings may be cut and/or machined to have precise dimensions so that an adaptive lens with a desired size may be produced. In some embodiments, stretched sheet 411 is held using rings with inner diameter 4.5 cm, outer diameter 5 cm and thickness 5 mm. However, any suitable rigid structure having a size suitable for the adaptive lens being produced may in general be used.

Membrane 412 is bonded to support structure 430. The support structure may comprise any suitable material, including those materials identified above in relation to support 101 in FIG. 1. In some embodiments, support structure 430 comprises PDMS, which may for example be filled and/or cured. In some embodiments, a molded support structure may have a hole punched through it to create a cavity and to define the diameter of the adaptive lens being produced. For example, the hole may be 1 cm in diameter.

Membrane 412 is bonded to support structure 430 using any suitable material and/or technique such that one side of the cavity within the support structure is sealed. In some embodiments, adhesive is applied to the membrane and/or the support structure and force applied to the adhesive regions to bond the two elements together. The adhesive may be elastomeric and/or not rigid, such that delamination and/or failure of the seal between membrane 412 and the support structure 430 do not occur. Once the adhesive has set, any excess material of the membrane not bonded to the support structure may be removed.

Sheet 420 may comprise any suitable material, including those materials identified above in relation to membranes 102 and 103 in FIG. 1. In some embodiments, sheet 420 comprises acrylic, for example transparent acrylic elastomer sheets such as VHB 4905 or 4910 manufactured by 3M Company.

Sheet 420 is stretched to form stretched sheet 421. The stretching may be achieved using any suitable technique, including mechanically exerting forces at the periphery of the sheet. In some embodiments, a stiff material (e.g., polyethylene) may be attached to the periphery of sheet 420 and a moveable apparatus coupled to the stiff material. The moveable apparatus may be used to apply a displacement to the stiff material and thereby cause a strain to be generated in the sheet in a direction approximately biaxial to the central region of the sheet. However, in general any method that produces a suitable strain in sheet 420, such that the sheet increases in surface area, may be used. In some embodiments, sheet 420 is stretched in at least one direction between 100% and 500%, for example 350% in both x and y directions within the plane of the sheet. A though FIG. 4A depicts both sheet 420 and stretched sheet 421 as approximately flat, there is no requirement that either is flat, as the invention is not limited in this regard. As a non-limiting example, sheet 420 may be stretched across a curved surface to produce stretched sheet 421.

Stretched sheet 421 is cut to produce membrane 422. Any suitable technique may be used to cut the stretched sheet that retains some or all of the strain produced during stretching within membrane 422. In some embodiments, rigid structures are applied to either side of the stretched sheet 421 to constrain a region of the stretched sheet, and the area of the stretched sheet around the rigid structures is cut away. For example, rigid plastic rings may be applied on either side of the stretched sheet. The plastic rings may be cut and/or machined to have precise dimensions so that an adaptive lens with a desired size may be produced. In some embodiments, stretched sheet 421 is held using rings with inner diameter 4.5 cm, outer diameter 5 cm and thickness 5 mm. However, any suitable rigid structure having a size suitable for the adaptive lens being produced may in general be used.

Membrane 422 is provided with electrodes on two sides, effectively "sandwiching" membrane 422 between the electrodes, to produce actuating membrane 423. The stack of electrodes and membrane 422 are shown in FIG. 4A in an exploded view; it should be appreciated that during production the electrodes contact at least a portion of the surface of membrane 422. The electrodes may comprise any suitable material that is substantially optically and/or acoustically transparent and that can conduct electricity sufficiently to produce a potential difference across the electrodes. In some embodiments, the electrodes comprise a mat of single-walled carbon nanotubes (SWCNT). For example, a mat of SWCNTs may be provided to the membrane 422 (which is at least partially stretched) via a filtration-transfer method to produce an actuating membrane having a substantially transparent layer of conductive material on its surface. In some embodiments, the electrodes are circular.

In some embodiments, the electrodes are circular with one or more conductive lobes 424, as shown in FIG. 4A. The lobes may, or may not, comprise the same material(s) as the remainder of the electrodes, and may provide a convenient path for an electrical connection to be provided to the electrodes via the lobes. In some embodiments, the lobes are oriented at opposing sides of the electrodes, as shown in FIG. 4A, which may avoid short circuits between the electrodes. For example, the upper electrode may have a lobe oriented in a first direction and the lower electrode may have a lobe oriented in a second direction, opposite to the first direction. In some embodiments, the electrodes are substantially identical to one another, though the electrodes may also differ from one another in size and/or material composition. In some embodiments, at least one of the electrodes comprises multiple electrode areas that may be actuated separately, as will be described in further detail below in relation to FIGS. 9A-B.

Actuating membrane 423 is bonded to support structure 430 using any suitable material and/or technique such that one side of the cavity within the support structure is sealed. In some embodiments, adhesive is applied to the actuating membrane and/or the support structure and force applied to adhesive regions to bond the two elements together. The adhesive may be elastomeric and/or not rigid, such that delamination and/or failure of the seal between actuating membrane 423 and the support structure 430 do not occur. Once the adhesive has set, any excess material of the actuating membrane not bonded to the support structure may be removed.

Fluid 440 is added to the chamber (e.g., the closed cavity) within support structure 430. The fluid may be provided into the chamber in any suitable way that does not damage membrane 412, actuating membrane 423 or the seals of each to support structure 430. In some embodiments, one or more injection ports are created through support structure 430 into the chamber. The fluid may then be provided via an injection port, for example via a syringe. An injection port may be filled after the fluid is provided, for example by using a moisture-curing silicone elastomer. However, any suitable material for filling an injection port may be used. The provided fluid 440 may be any suitable fluid, or combination of fluids, for use in an adaptive lens, including any fluid(s) having any properties identified above in discussion of fluid 104 shown in FIG. 1. In some embodiments, fluid 440 is a substantially transparent silicone oil.

In some embodiments, fluid is added using a fine gauge syringe (e.g., 29 gauge) through the support structure. This may allow the perforation created by the syringe to close when the syringe is withdrawn, mitigating the need to create an injection port as described above. However, any suitable technique for introducing fluid 440 to chamber 432 may in general be used.

Air may remain trapped in chamber 432 after addition of fluid 440. Trapped air may be removed during addition of the fluid, or may be left to diffuse through the membranes, depending on the material that the membranes comprise and whether air diffuses through them.

Electrical contact is provided to electrodes 450, for example, via electrically conductive wires. In the example of FIG. 4B, electrodes 450 comprise lobes which may facilitate coupling of wires (not shown) to the electrodes through a portion of the support structure 431. In some embodiments, the electrodes are conductively coupled to a high voltage power supply, for example having a voltage supply between 100V and 20 kV DC.

It will be appreciated by those of skill in the art that the process depicted in FIGS. 4A-B is provided as an example, and that variations of the techniques described and materials used may also be utilized to produce an adaptive lens having high transmittance (e.g., >85% transmittance of visible light) and having adaptive optical and/or acoustic properties by modifying the shape of one or more membranes using an electric field.

Figure 5A:
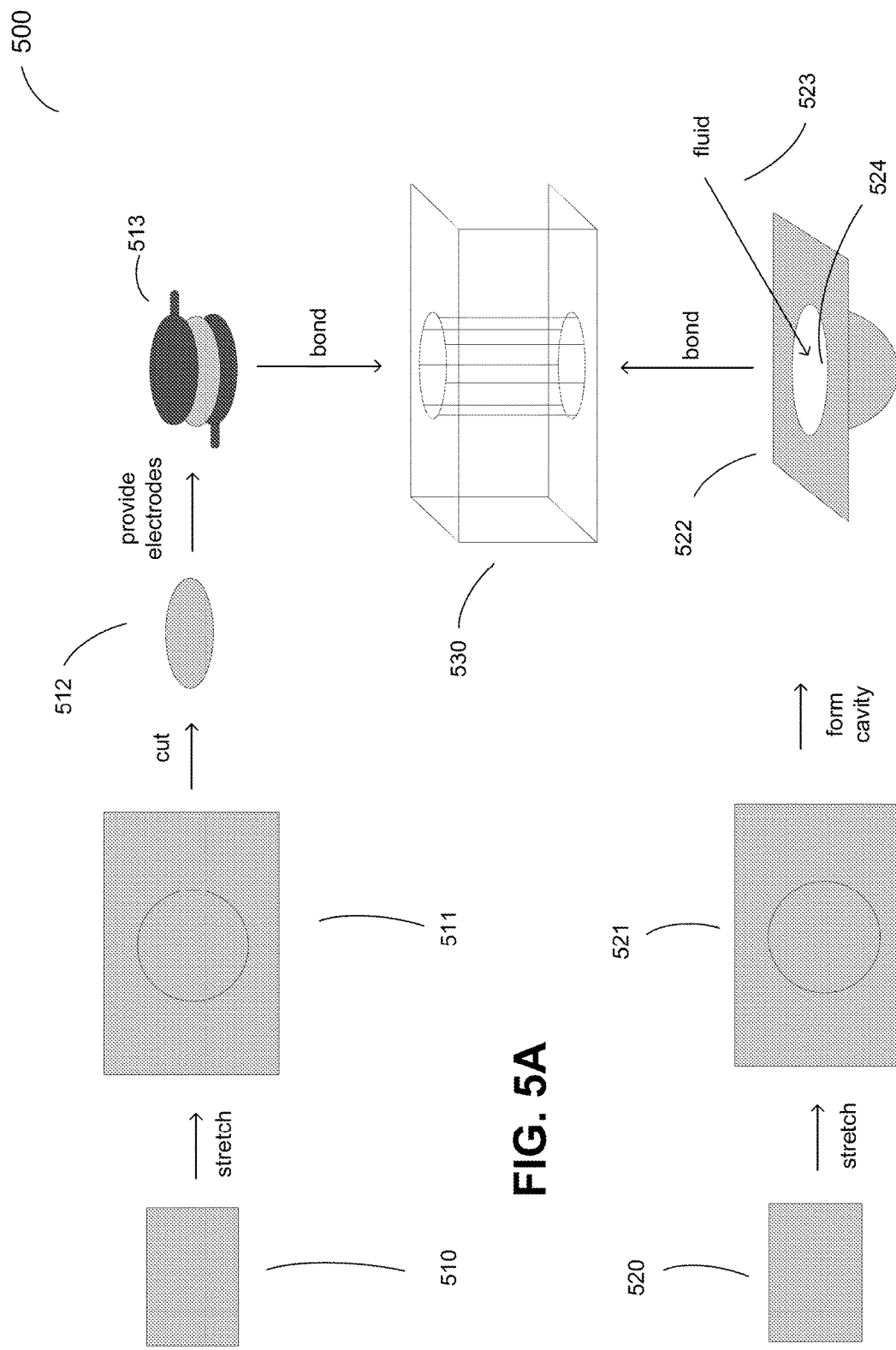

FIGS. 5A-B depict a second exemplary manufacturing process of producing an adaptive lens, according to some embodiments of the present invention. Process 500 is depicted as a series of steps identified with arrows, the details of which are described below.

As an overview, a first membrane is produced from a sheet of a suitable material 510 that is stretched to produce stretched sheet 511 and then cut to produce membrane 512. Electrodes are provided to membrane 512 to produce actuating membrane 513. In addition, a sheet of suitable material 520 is stretched to produce stretched sheet 521 which is deformed to produce stretched, deformed sheet 522. A fluid 523 is provided to a cavity 524 created by said deformation. Actuating membrane 513 and stretched deformed sheet 522 are bonded to support structure 530 to produce an adaptive lens. The process depicted in FIGS. 5A-B may be suitable, for example, to produce lens 100 shown in FIG. 1 and/or lens 200 shown in FIG. 2.

The process of creating actuating membrane 513 is analogous to producing actuating membrane 423 shown in FIG. 4A, and the complete description of that process above applies to the steps shown in FIG. 5A of stretching, cutting and providing electrodes. In addition, the description above regarding sheet 420 applies to sheet 510; the description regarding stretched sheet 421 applies to stretched sheet 511; the description regarding membrane 422 applies to membrane 512; and the description regarding actuating membrane 423 applies to actuating membrane 513.

The process of producing stretched sheet 521 is analogous to producing stretched sheet 411 shown in FIG. 4A, and the complete description of that process above applied to the step shown in FIG. 5A of stretching. In addition, the description above regarding sheet 410 applies to sheet 520; the description regarding stretched sheet 411 applies to stretched sheet 521.

Stretched sheet 521 is deformed to produce stretched deformed sheet 522 comprising cavity 524. The sheet may be deformed via any suitable technique that produces a cavity within the stretched sheet. In some embodiments, stretched sheet 521 is deformed via use of a vacuum. The cavity produced may be of any shape and size suitable for filling with fluid such that, once the stretched sheet is bonded to support structure 530 and the support structure is bonded to actuating membrane 513, the fluid has a positive pressure.

Fluid 523 is provided into cavity 524. The fluid may be provided using any suitable technique. As one non-limiting example, the fluid may be provided by injecting fluid into the cavity using a syringe. The provided fluid may be any suitable fluid, or combination of fluids, for use in an adaptive lens, including any fluid(s) identified above in discussion of fluid 104 shown in FIG. 1.

Actuating membrane 513 is bonded to support structure 530 using any suitable material and/or technique such that one side of the cavity within the support structure is sealed. In some embodiments, adhesive is applied to the actuating membrane and/or the support structure and force applied to the adhesive regions to bond the two elements together. The adhesive may be elastomeric and/or not rigid, such that delamination and/or failure of the seal between actuating membrane 513 and the support structure 530 do not occur. Once the adhesive has set, any excess material of the actuating membrane not bonded to the support structure may be removed.

Stretched deformed sheet 522 is bonded to support structure 530 using any suitable material and/or technique such that one side of the cavity within the support structure is sealed and at least some of the fluid 523 is sealed inside the cavity. In some embodiments, stretched deformed sheet 522 is bonded to support structure 530 such that fluid remaining inside the closed cavity has a positive pressure.

Air may remain trapped in cavity 523 after bonding of the stretched deformed sheet 522. Trapped air may be removed during addition of the fluid, or may be left to diffuse through the membranes, depending on the material that the membranes comprise and whether air diffuses through them.

Electrical contact is provided to electrodes 550, for example, via electrically conductive wires. In the example of FIG. 5B, electrodes 550 comprise lobes which may facilitate coupling of wires (not shown) to the electrodes through a portion of the support structure 531. In some embodiments, the electrodes are conductively coupled to a high voltage power supply, for example having a voltage supply between 100V and 20 kV DC.

It will be appreciated that the process depicted in FIGS. 5A-B is provided as an example, and that variations of the techniques described and materials used may also be utilized to produce an adaptive lens having high transmittance (e.g., >85% transmittance of visible light) and having adaptive optical and/or acoustic properties by modifying the shape of one or more membranes using an electric field.

Figure 6:
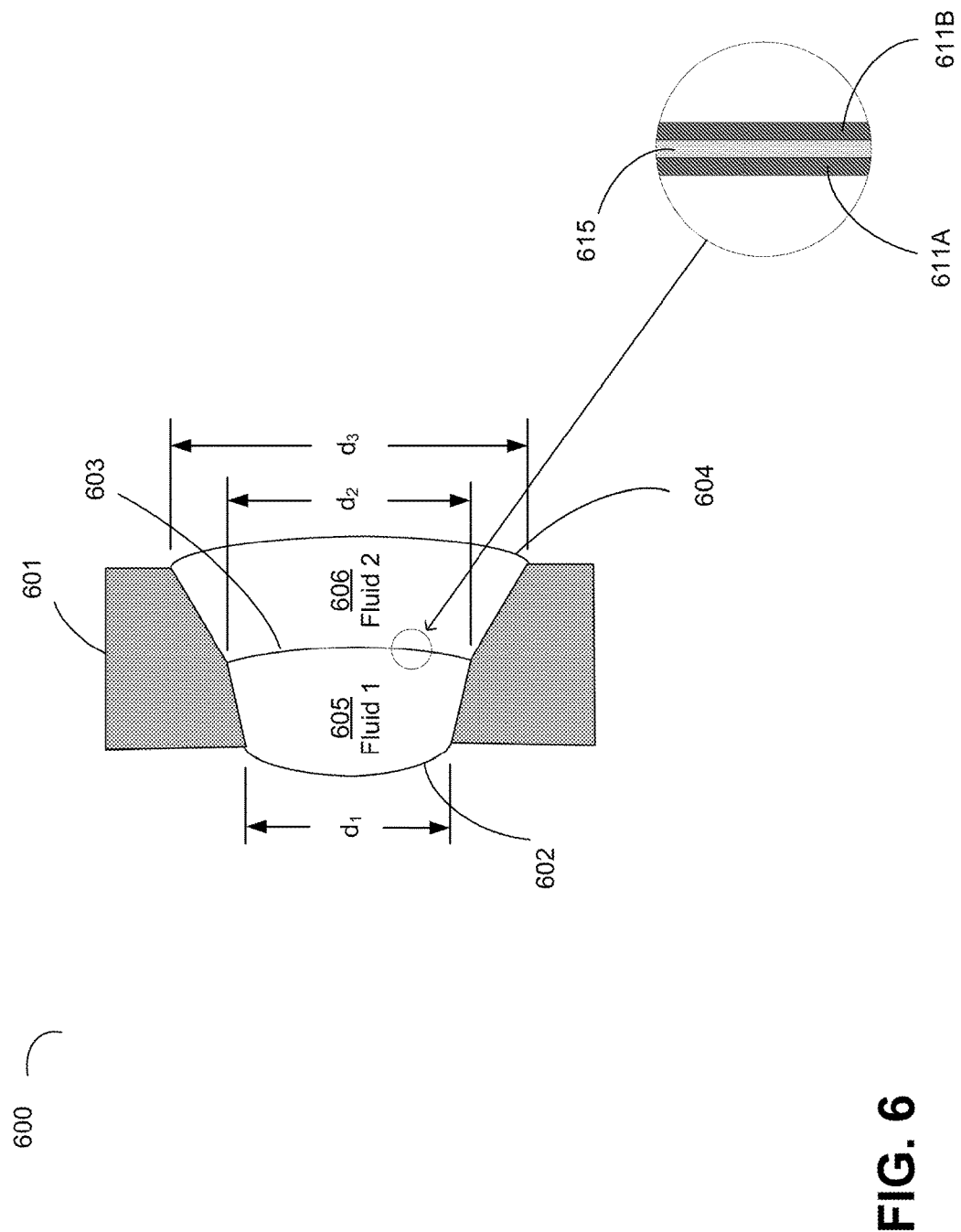
FIG. 6 illustrates a cross-sectional view of an adaptive lens comprising two chambers, according to some embodiments of the present invention.

FIG. 6 illustrates a cross-sectional view of an adaptive lens comprising two chambers, according to some embodiments of the present invention. Lens 600 includes support 601, membranes 602, 603 and 604 and fluids 605 and 606. Support 601 is a relatively stiff frame that supports membranes 602, 603 and 604, and encloses fluids 605 and 606, each of which may have a constant volume. In the example of FIG. 6, membrane 603 is an actuating membrane whose shape may be changed by an electric field, as described below.

In the example of FIG. 6, the relative diameters of membranes 602, 603 and 604 may determine whether incoming light and/or sound waves converge or diverge after passing through the lens. By changing the shape of membrane 603, the shape of membranes 602 and 604 may consequently change due to pressure that fluids 605 and 606 apply to membranes 602 and 604, respectively. Accordingly, optical and/or acoustic properties of the lens may be altered. For example, the curvature of any combination of membranes 602, 603 and 604 may be altered, changing the focal length of the lens.

Fluids 605 and 606 may comprise any suitable fluids. In some embodiments, fluids 605 and 606 are both non-permeable liquids that are highly transparent, chemically stable, and compatible with materials used in membranes 602, 603 and 604 (i.e., do not react with or cause to change shape). Light and/or sound waves incident upon lens 600 may be refracted by fluids 605 and 606 each having a refractive index different from the refractive index of a medium in which lens 600 is located. For example, assuming spherical curvatures of membranes 602 and 604, the focal length of lens 600 in air (refractive index=1) may be approximated by:

$$\frac{1}{f} = (n-1)\left[\frac{1}{R_1} - \frac{1}{R_3} + \frac{(n-1)d}{nR_1R_3}\right]$$

wherein f is the resulting focal length of the lens, n is the refractive index of the lens (which may be approximately that of fluids 605 and 606 where the fluids are the same) and $R_1$ and $R_3$ are the radii of curvature of membranes 602 and 604, respectively.

In some embodiments, fluids 604 and 605 comprise silicone oil, which may have a refractive index between around 1.4 and 1.6. The silicone oil may comprise any liquid comprising polymerized siloxane, with or without one or more organic side chains, including PDMS. For example, silicone oil may comprise varying amounts of phenyl groups in side chain(s), which may yield silicone oils with various refractive indexes based on the number of phenyl groups. In some embodiments, fluids 605 and/or 606 comprises clear silicone oil PMX-200 as manufactured by Dow Corning Corporation. Any such silicone oil may be used, in whole or in part, in fluids 605 and/or 606. A fluid with any suitable refractive index may be used as fluids 605 and/or 606, as the invention is not limited in this regard. For example, the refractive index of fluid 605 and/or fluid 606 may be approximately 1.4.

Lens 600 may achieve increased transmittance of incident light and/or sound relative to lens 100 shown in FIG. 1, since in lens 600 the actuating membrane is in the center of two cavities, and consequently light and/or sound scattering due to actuation-induced roughness on the membrane can be minimized.

In some embodiments, fluids 605 and 606 are fluids with different indexes of refraction. The optical and/or acoustic properties of lens 600 may be chosen based on the choice of fluids 605 and 606 and their optical and/or acoustic properties.

In some embodiments, the relative radii of curvature of membranes 602, 603 and 604 may be chosen to adapt the optical and/or acoustic properties of lens 600. For example, some configurations of lens 600 may reduce undesirable lens effects, such as chromatic and/or spherical aberrations. In some embodiments, the radius of curvature of membrane 603 is less than the radius of curvature of membrane 604. In such an embodiment, lens 600 forms an achromatic doublet, which may minimize chromatic and/or spherical aberrations in a single lens. Since the radius of curvature of a membrane may depend both on the pressure of one or more fluids, and on the diameter of the membrane, a fluid pressure and/or a membrane diameter may also be similarly adjusted to adapt the optical and/or acoustic properties of lens 600. For example, the diameter of a membrane may be reduced, which may have the effect of increasing the radius of curvature.

Support 601 may comprise any suitable material, or combination of materials. In some embodiments, support

601 may be constructed from a sufficiently rigid material that can hold the membranes and does not suffer significant flexure under membrane tension (e.g., caused by pressure of fluids 605 and/or 606). Support 601 is not limited to be formed from a material of any particular transparency or opaqueness, though in some embodiments the support 601 comprises transparent material. In some embodiments, support 601 may comprise polydimethylsiloxane (PDMS), including filled and/or cured PDMS.

Support 601 may have any suitable shape. In the example of FIG. 1, support 601 forms a block having an approximately circular opening in which fluids 605 and 606 are located. However, in general support 601 may have any suitable shape and/or dimension suitable to support membranes 602, 603 and 604, and fluids 605 and 606. In some embodiments, support 601 is ring-shaped.

Membranes 602, 603 and 604 may comprise any suitable material. In some embodiments, membrane 602, membrane 603 and/or membrane 604 comprise a material whose shape may be altered such that optical and/or acoustic properties of the lens may in turn be altered due to the pressure exerted on the membranes by fluids 605 and/or fluid 606. In some embodiments, membrane 602, membrane 603 and/or membrane 604 comprise an electroactive material, such as an electroactuating polymer, such that the shape and/or position of the corresponding membrane(s) may be modified via the application of an electric field.

Membranes 602 and 603 may be connected to support 601 using any suitable bonding technique. In some embodiments, membranes 602 and 603 are bonded to support 601 with an adhesive. For example, a suitable adhesive may be stable over a range of operating temperatures of lens 600 and/or may retain adhesion for a suitable duration of operation of the lens. However, membranes 602 and 603 may be connected to support 601 using any technique that provides a stable attachment of the respective elements, for example such that fluid 604 does not substantially leak out of support 601. In some embodiments, membranes 602 and/or 603 are connected to support 601 via one or more mechanical couplings, e.g., via clamps, clips and/or pins.

In the example of FIG. 6, membrane 603 comprise actuating elastomer membrane 615 positioned between electrodes 611A and 611B, as shown in the inset in FIG. 6 depicting a magnified section of membrane 603. The actuating elastomer membrane 615 may comprise any suitable material. In some embodiments, the actuating elastomer membrane 615 may be prepared from a highly transparent silicone sheet or any carbon-based elastomer that is sufficiently transparent. In some embodiments, the material may transmit >90% of light in the visible portion of the electromagnetic spectrum (e.g., 400-700 nm). Such membrane materials include, but are not limited to, PDMS, silicones, acrylics, polyurethane, acrylic elastomers (e.g., VHB 4905 and/or VHB 4910, each produced by 3M Company) or a combination thereof. In some embodiments, the actuating elastomer membrane 615 may comprise the same or similar material as membrane 602 and/or membrane 604. In some embodiments, the refractive index of actuating elastomer membrane 615 is between 1.0 and 1.8, for example approximately 1.5.

Electrodes 611A and 611B may comprise any suitable material. In some embodiments, the electrodes 611A-B may be prepared from a highly transparent electrically conductive material that conducts electricity yet transmits >90% of light in the visible portion of the electromagnetic spectrum. As a non-limiting example, electrodes 611A-B may be constructed from carbon nanotubes, such as single-walled carbon nanotubes (SWCNT). However, any material with a suitable transmittance of visible light and at least a limited ability to conduct electricity may be used. In some embodiments, at least one of electrodes 611A and 611B comprises a SWCNT mat. Electrodes 611A and 611B may have any suitable thickness. In some embodiments, electrodes 611A and/or 611B have a thickness less than 300 nm, such as 50 nm.

Although not shown in FIG. 6, electrode 611A and/or electrode 611B may protrude into support 601, which may for example provide a coupling for an electrical connection. However, in general each of electrodes 611A-B may be of any suitable shape. Moreover, at least one of electrodes 611A-B may comprise multiple electrode areas that may be actuated separately, as will be described in further detail below in relation to FIG. 9A-B. Each of electrodes 611A and 611B may cover any fraction of the surface of the actuating elastomer membrane 615, including the entire surface. Moreover, electrodes 611A and 611B may, or may not be, of the same size, shape or structure.

Membranes 602 and 604 may comprise any suitable material, including those materials described above in relation to actuating elastomer membrane 615. In some embodiments, membranes 602 and 604 may be prepared from a highly transparent silicone sheet or any carbon-based elastomer that is sufficiently transparent. In some embodiments, the material may transmit >90% of light in the visible portion of the electromagnetic spectrum (e.g., 400-700 nm). Such membrane materials include, but are not limited to, PDMS, silicones, acrylics, polyurethane, acrylic elastomers (e.g., VHB 4905 and/or VHB 4910, each produced by 3M Company) or a combination thereof.

Electrodes 611A and/or electrode 611B may be configured to receive any suitable voltage to actuate the actuating elastomer membrane 615. In some embodiments, electrodes 611A and/or 611B are configured to receive a voltage between 500V and 10 kV, for example, 1.5 kV. The Coulombic attraction between electrodes 611A and 611B may generate a Maxwell stress within at least part of actuating elastomer membrane 615. Such stress may cause at least part of actuating elastomer membrane 615 to change its shape, which as described above may result in a change to one or more optical and/or acoustic properties of lens 600.

In some embodiments, actuating elastomer membrane 615 is configured to exhibit stress when no voltage is supplied to the electrodes 611A-B. In such embodiments, the strain may, for example, allow the modification of the shape of membrane 603 by increasing as well as decreasing the strain, thus providing a greater range of potential motion compared with a membrane not exhibiting strain (which may only be capable of having its strain increased). That is, it may not be possible to increase the stress of an actuating elastomer membrane that exhibited no stress when no voltage was supplied to electrodes in proximity to the membrane.

An electric field may be applied to electrodes 611A-B via electrically conductive pathways provided in any suitable way. In some embodiments, conductive wires (not shown) within support 601 are connected to electrodes 611A and 611B and are connected to a power supply outside of the lens. Such conductive wires may be further coupled to support 601 to provide further stability of the connection, for example via adhesive (which may be elastomeric). As described above, at least one of electrodes 611A and 611B may protrude into support 601, which may aid attachment of said conductive wires to the electrodes.

In some embodiments, lens 600 has an optical transmittance of 550 nm light greater than 85%. In some embodiments, lens 600 is configured to exhibit a fractional change in focal length up to 100% by application of a voltage up to 5000V across electrodes 611A-B.

The example of FIG. 6 is provided as an exemplary embodiment and variations of the structure shown in FIG. 6 may be devised. For example, membranes 602 and/or 604 may be actuated in the same or a similar manner to membrane 603 by providing suitable electrodes to respective membranes 602 and/or 604. Actuating two or three membranes may provide a greater range of optical and/or acoustic properties and/or may allow for finer control of said properties. Furthermore, any number of membranes, both actuating and non-actuating, may be utilized in lens 600, some examples of which are discussed below.

Figure 7:
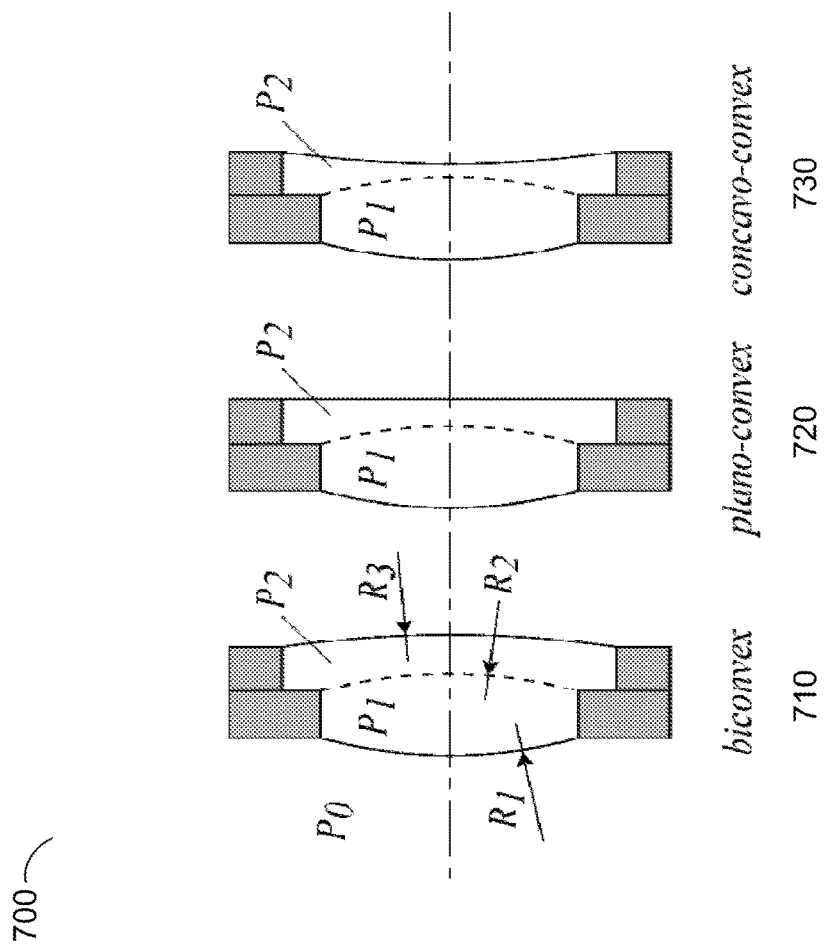
FIG. 7 illustrates cross-sectional views of adaptive lens configurations corresponding to the adaptive lens shown in FIG. 6.

FIG. 7 illustrates cross-sectional views of adaptive lens configurations corresponding to the adaptive lens shown in FIG. 6. Lenses 710, 720 and 730 illustrate exemplary lens configurations, to be described below. Each of lenses 710, 720 and 730 comprise two cavities, each comprising a fluid, as described above in relation to FIG. 6.

Lens 710 is a biconvex lens in which a first cavity has a pressure $P_1$ that is higher than an ambient pressure $P_0$. For example, pressure $P_0$ may be the pressure of air and the cavity may contain a fluid having a pressure higher than that of the air. In addition, lens 710 includes a second cavity having a pressure $P_2$ that is higher than the ambient pressure $P_0$. A biconvex lens may cause an incident collimated beam of sound and/or light to converge, as is known in the art.

Lens 720 is a plano-convex lens in which a first cavity has a pressure $P_1$ that is higher than the ambient pressure $P_0$ and a second cavity having a pressure $P_2$ equal to that of the ambient pressure $P_0$. A plano-convex lens may cause an incident collimated beam of sound and/or light to converge, as is known in the art.

Lens 730 is a concavo-convex lens in which a first cavity has a pressure $P_1$ that is higher than an ambient pressure $P_0$ and a second cavity having a pressure less than that of the ambient pressure $P_0$. For example, the second cavity may contain a fluid having a negative pressure. A concavo-convex lens may cause an incident collimated beam of sound and/or light to diverge, as is known in the art.

Figure 8:
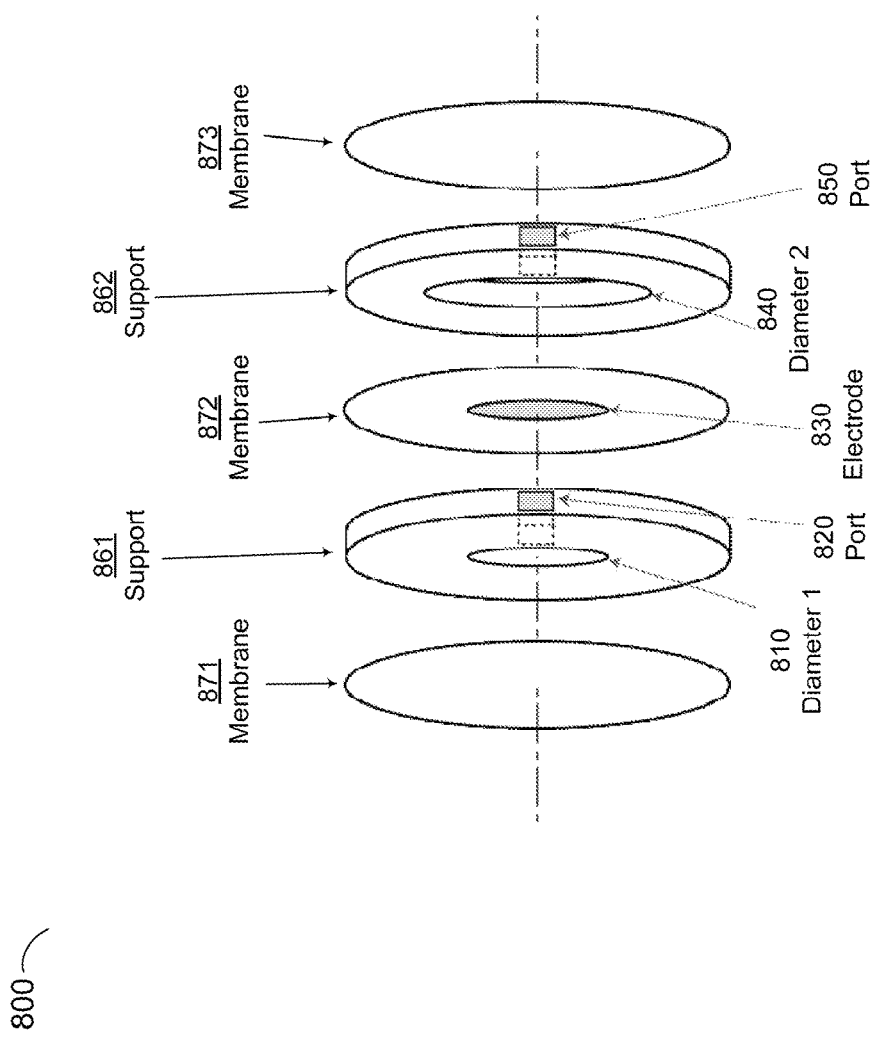
FIG. 8 is an exploded view of some components of an adaptive lens comprising two chambers, according to some embodiments of the present invention.

FIG. 8 is an exploded view of some components of an adaptive lens comprising two chambers, according to some embodiments of the present invention. Lens 800 comprises membranes 871-873, supports 861 and 862, and electrode 830. Lens 800 may correspond, for example, to a lens having three membranes and two chambers, such as lens 600 shown in FIG. 6. In the example of FIG. 8, a second electrode, not shown, is attached to the rear side of membrane 872.

Supports 861 and 862 each comprise a port 820 and 850, respectively, which may be used to provide a fluid to lens 800, which may be provided during assembly as described above in relation to FIGS. 3A-B and FIGS. 4A-B. For example, lens 600 may be assembled using the elements shown in FIG. 8, and port 820 may be used to provide fluid 605 and port 850 may be used to provide fluid 606, for example via a syringe or other vessel(s) supplied to the port.

Figure 9A:
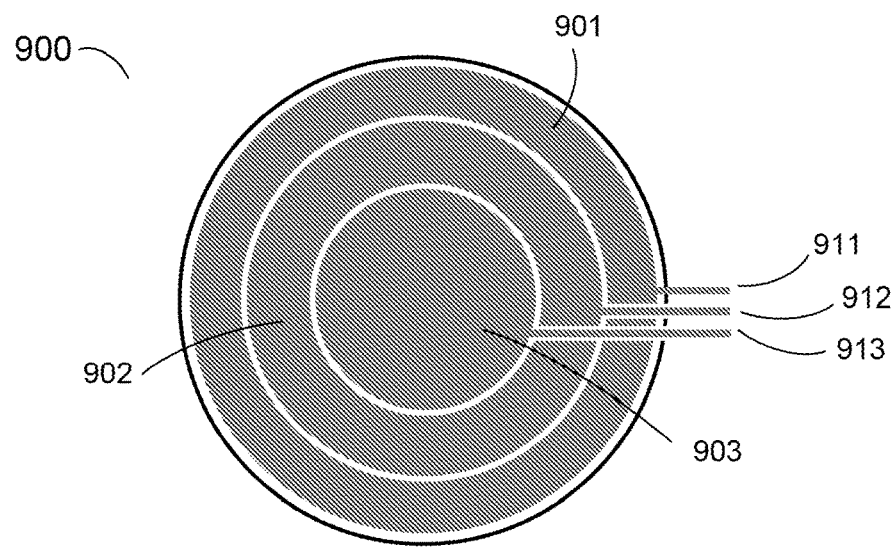
FIGS. 9A-B depict electrode configurations of an adaptive lens wherein the electrodes comprise multiple areas, according to some embodiments of the present invention.
Figure 9B:
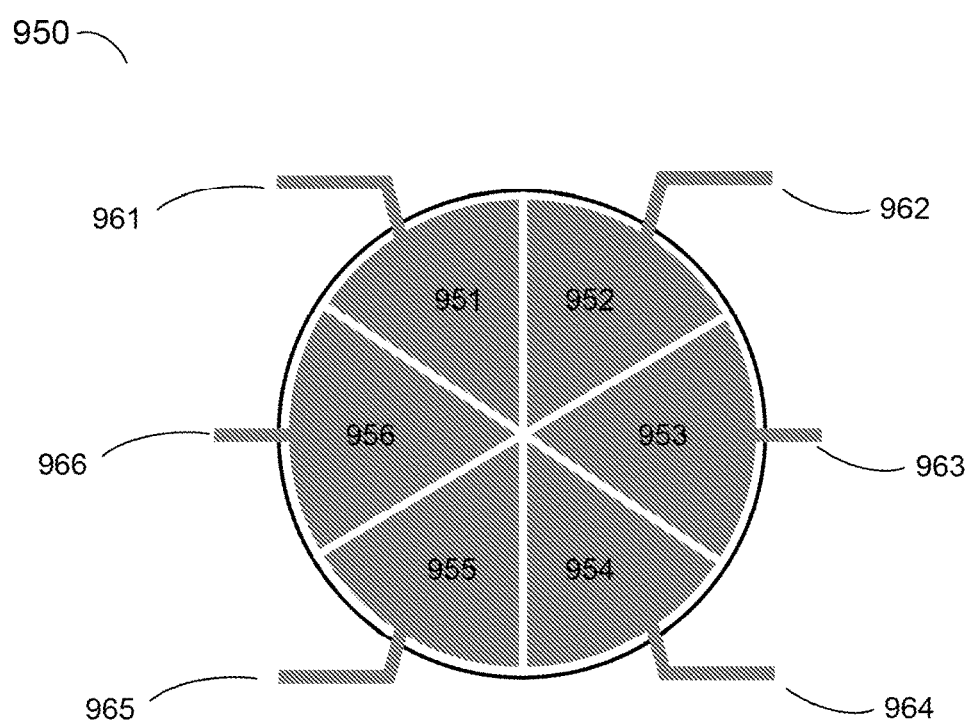

FIGS. 9A-B depict electrode configurations of an adaptive lens wherein the electrodes comprise multiple areas, according to some embodiments of the present invention. Electrode 900 shown in FIG. 9A and electrode 950 shown in FIG. 9B each comprise multiple areas which may be actuated individually. Individual actuation of electrode areas may allow, for example, spatial control over the particular area of the membrane to which the electrode is coupled.

Electrode 900 comprises three concentric electrode areas 901, 902 and 903, each of which may be actuated via an electrical connection to connectors 911, 912 and 913, respectively. Electrode 900 may enable the control of the optical and/or acoustic path of a lens utilizing electrode 900 by, for example, controlling the distance of the path from the optical axis. In some embodiments, electrode 900 is utilized in an adaptive lens configured to converge optical and/or acoustic rays at a point off the optical axis of the lens.

Electrode 950 comprises six areas 951, 952, 953, 954, 955 and 956, each of which may be actuated via an electrical connection to connectors 961, 962, 963, 964, 965 and 966, respectively. Electrode 950 may enable control over a lens utilizing electrode 950 by controlling the lens' optical axis, for example by facilitating image shifts or vibration compensation techniques.

In some embodiments, electrode 900 and/or electrode 950 comprise SWCNTs. In some embodiments, electrode 900 and/or electrode 950 are produced through masking and stamping SWCNTs. For example, masking may be performed via lithographic techniques.

FIGS. 10A-B illustrate an adaptive lens comprising a stiff circular member, according to some embodiments of the present invention. FIG. 10A illustrates a cross-sectional view of lens 1000, and FIG. 10B illustrates a face-on view of lens 1000. Lens 1000 comprises membranes 1002 and 1003 attached to support 1001, and fluid 1004. Stiff circular member 1005 is coupled to membrane 1002 around its perimeter. Membrane 1002 comprises actuating elastomer membrane 1015 and electrodes 1011A-B. Electrodes 1011A-B each comprise three areas, which as described above in relation to FIG. 9, may allow for control of a lens' optical axis. FIG. 10B illustrates the three areas, $1011A_1$, $1011A_2$, and $1011A_3$ of electrode 1011A, each of which may be actuated separately as described above. Electrode 1011B includes areas $1011B_1$, $1011B_2$, and $1011B_3$, not shown in the figures. Lens 1000 may be configured to steer the path of an optical beam, as described below.

Support 1001 may comprise any suitable material having any suitable properties, including any material and/or properties indicated above in reference to support 101 shown in FIG. 1. Membranes 1002 and 1003 may comprise any suitable material having any suitable properties, including any material and/or properties indicated above in reference to membranes 102 and/or 103 shown in FIG. 1. Electrodes 1011A and 1011B may comprise any suitable material having any suitable properties, including any material and/or properties indicated above in reference to electrodes 111A and/or 111B shown in FIG. 1. Actuating elastomer membrane 1015 may comprise any suitable material having any suitable properties, including any material and/or properties indicated above in reference to actuating elastomer membrane 115 shown in FIG. 1. Fluid 1004 may be any suitable fluid, or combination of fluids, including any fluid(s) indicated above in reference to fluid 104 shown in FIG. 1.

An electric field may be applied to any or all areas of electrodes 1011A-B via electrically conductive pathways provided in any suitable way. In some embodiments, a conductive wire (not shown) within support 1001 is connected to each area of electrodes 1011A and 1011B (e.g., six conductive wires in total) and are connected to a power supply outside of the lens. Such conductive wires may be further coupled to support 1001 to provide further stability of the connection, for example via adhesive (which may be elastomeric). As described above, at least one of electrodes 1011A and 1011B may protrude into support 1001, which may aid attachment of said conductive wires to the electrodes.

Stiff circular member 1005 may comprise any stiff and substantially transparent material, such as glass and/or transparent plastic (e.g., acrylic). Stiff circular member 1005 may have any suitable index of refraction, though preferably has an index of refraction approximately equal to that of fluid 1004. Stiff circular member 1005 may comprise first and second sides, being the interfaces between the member and fluid 1004 and the air, respectively, that may have any suitable shape. In some embodiments, stiff circular member 1005 has first and second sides that are substantially flat. In some embodiments, stiff circular member 1005 has first and second sides that form a lens curvature. As non-limiting examples, first and second sides of stiff circular member may form a biconvex lens, a plano-convex lens, a plano-concave lens or a biconcave lens.

In some embodiments, lens 1000 may be adapted to adjust a direction of light and/or sound waves incident upon lens 1000 such that said waves are directed away from the optical axis of lens 1000. For example, electrode $1011A_1$ may be actuated and electrodes $1011A_2$ and $1011A_3$ may not be (or may be actuated less) such that the axis of stiff circular member 1005 points away from the optical axis of lens 1000. Accordingly, light passing through lens 1000 in this scenario may converge at a point away from the optical axis of the lens.

Advantages of lens 1000 may include reduced image distortion compared with a membrane that comprises multiple electrode areas. For example, an electrode with multiple areas such as electrode 950 shown in FIG. 9B may create image distortions when actuating a subset of areas 951-956 to adjust the direction of light off the optical axis. By including stiff circular member 1005, lens 1000 may provide for the same ability to adjust the direction of light while reducing image distortion that may be caused by the shape of a lens using electrode 950.

Figure 11:
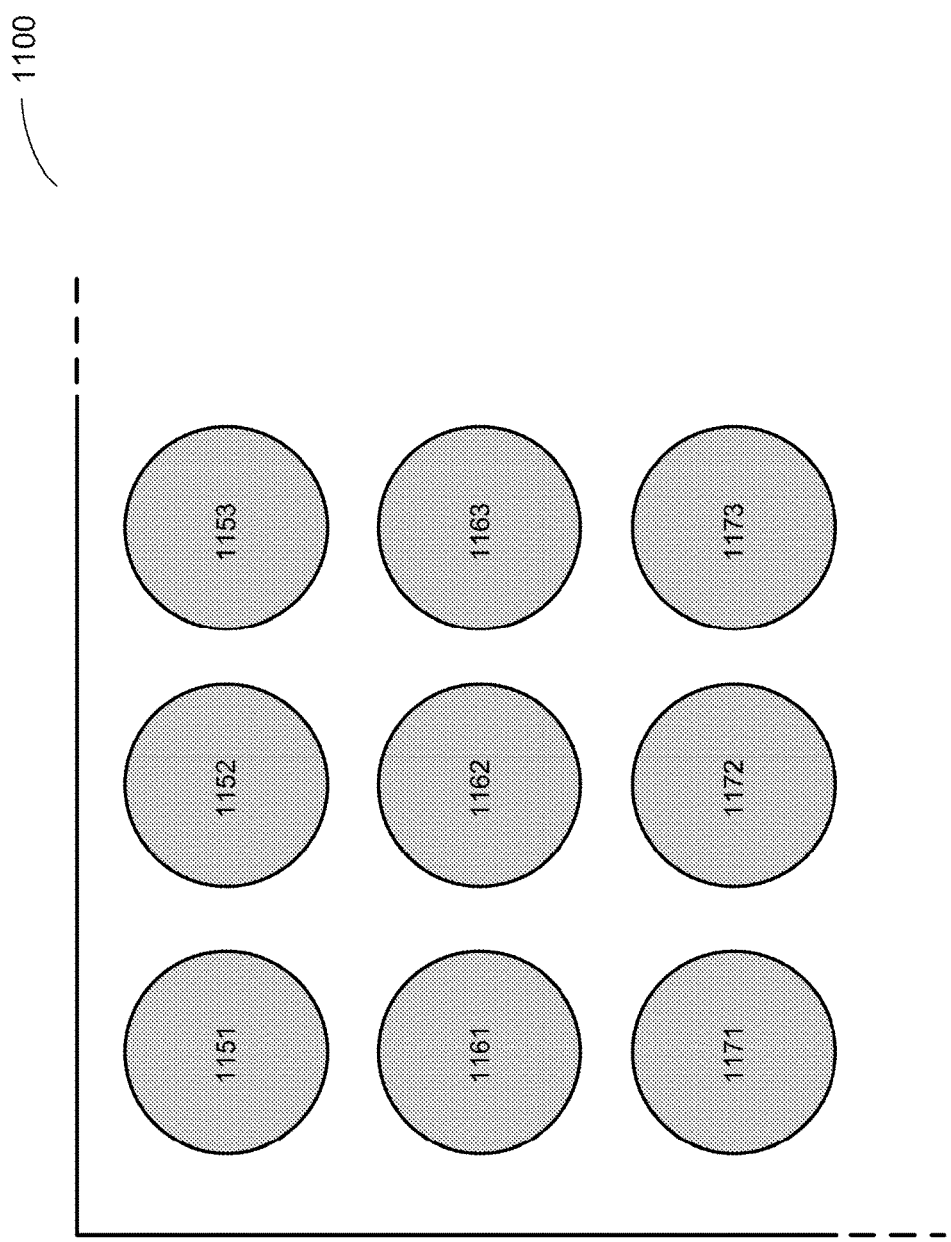
FIG. 11 depicts a lens array, according to some embodiments of the present invention.

FIG. 11 depicts a lens array, according to some embodiments of the present invention. Lens array 1100 comprises an array of adaptive lenses and/or mirrors, each of which may individually be of any type of adaptive lens and/or mirror described herein. For example, lens 1151 may be a lens of a type substantially identical to lens 100 shown in FIG. 1, and lenses 1152-1153 may be lenses of a type substantially identical to lens 600 shown in FIG. 6. However, any suitable combination of lenses may be used in lens array 1100. Lenses in lens array 1100 may be convex, concave or a mixture of both.

Lens array 1100 may be provided over a flat or curved substrate, and may provide for precise control of optical and/or acoustic wave paths in three dimensions. Non-limiting examples of suitable applications include adaptive multiple focal optical detectors, large-area lightweight optical collectors and lenslet arrays (e.g., for wavefront correction, including in combination with Shack-Hartmann sensors).

Lens array 1100 may additionally or alternatively be used for projection and/or illumination. In some embodiments, lens array 1100 is curved around a substrate and configured to detect objects over larger solid angles than a conventional lens system. For example, the lens array may have an effective acceptance angle of light and/or sound many times that of a single lens. Such a lens array might be considered similar to a compound "eye" such as that observed in the common housefly.

Lens array 1100 may additionally or alternatively be used in a phased array. In some embodiments, lens array 1100 forms part of a phased array and at least a portion of the lenses in the lens array act as antennae, reinforcing acoustic waves by transmitting an acoustic wave from each lens with varying phases in such a way as to reinforce the combined acoustic wave produced. Use of an adaptive lens to produce acoustic waves is described below in relation to FIG. 12. Lens array 1100, when used in a phased array, may have an advantage that the fraction of the phased array surface that comprises a sound source is high due to the compact nature of the adaptive lenses.

Figure 12:
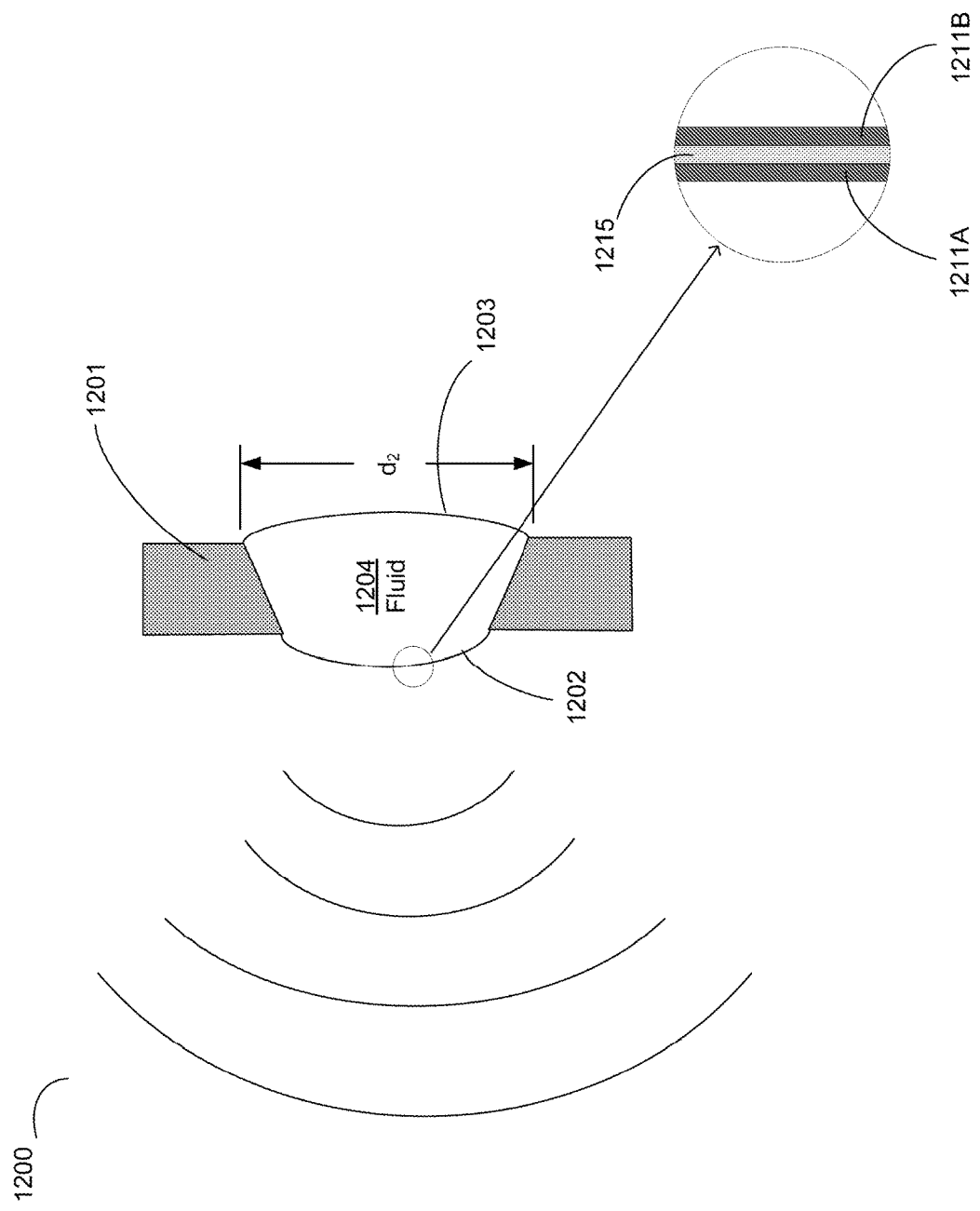
FIG. 12 illustrates a cross-sectional view of an adaptive lens configured to produce acoustic waves, according to some embodiments of the present invention.

FIG. 12 illustrates a cross-sectional view of an adaptive lens configured to produce acoustic waves, according to some embodiments of the present invention. Lens 1200 comprises membranes 1202 and 1203 attached to support 1201, and fluid 1204. Membrane 1202 comprises actuating elastomer membrane 1215 and electrodes 1211A-B. Lens 1200 is configured to produce acoustic waves as described below.

Support 1201 may comprise any suitable material having any suitable properties, including any material and/or properties indicated above in reference to support 101 shown in FIG. 1. Membranes 1202 and 1203 may comprise any suitable material having any suitable properties, including any material and/or properties indicated above in reference to membranes 102 and/or 103 shown in FIG. 1. Electrodes 1211A and 1211B may comprise any suitable material having any suitable properties, including any material and/or properties indicated above in reference to electrodes 111A and/or 111B shown in FIG. 1. Actuating elastomer membrane 1115 may comprise any suitable material having any suitable properties, including any material and/or properties indicated above in reference to actuating elastomer membrane 115 shown in FIG. 1. Fluid 1204 may be any suitable fluid, or combination of fluids, including any fluid(s) indicated above in reference to fluid 104 shown in FIG. 1.

An electric field may be applied to electrodes 1211A-B via electrically conductive pathways provided in any suitable way. In some embodiments, conductive wires (not shown) within support 1201 are connected to electrodes 1211A and 1211B and are connected to a power supply outside of the lens. Such conductive wires may be further coupled to support 1201 to provide further stability of the connection, for example via adhesive (which may be elastomeric). As described above, at least one of electrodes 1211A and 1211B may protrude into support 1201, which may aid attachment of said conductive wires to the electrodes.

In some embodiments, acoustic waves are produced by lens 1200 by actuating membrane 1202 using an oscillating electric field. For example, an electric field may be applied to electrodes 1211A-B which oscillates over time, causing the surface of lens 1200 to oscillate and thereby produce acoustic waves. In some embodiments, lens 1200 produces ultrasonic acoustic waves via application of an oscillating electric field.

Figure 13:
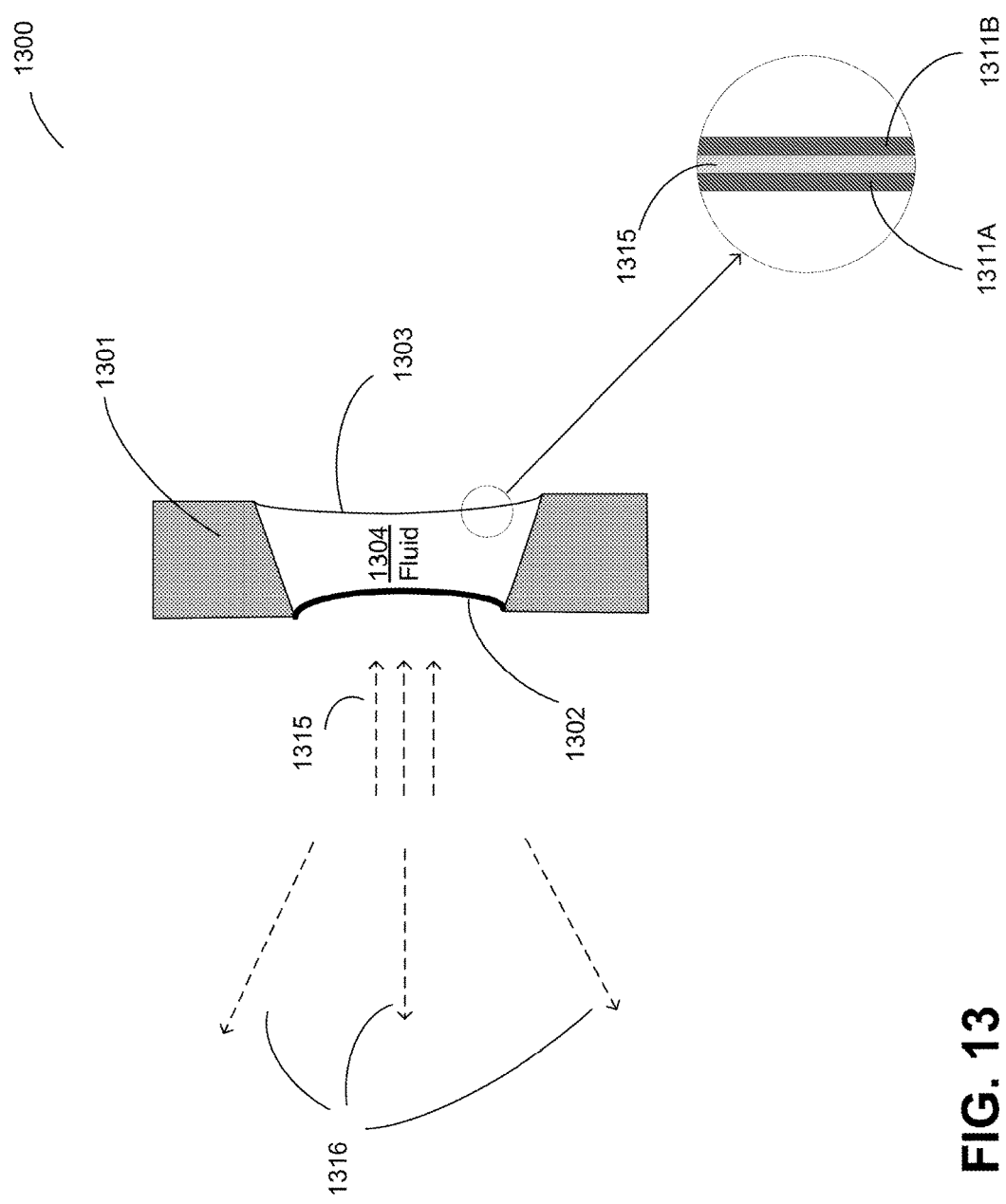
FIG. 13 illustrates a cross-sectional view of an adaptive lens configured as a minor, according to some embodiments of the present invention.

FIG. 13 illustrates a cross-sectional view of an adaptive lens configured as a mirror, according to some embodiments of the present invention. Lens 1300 comprises membranes 1302 and 1303 attached to support 1301, and fluid 1304. Membrane 1303 comprises actuating elastomer membrane 1315 and electrodes 1311A-B. Membrane 1302 comprises a metallic layer. Lens 1300 is configured to reflect light waves by reflecting incoming light waves 1315 from the metallic layer of membrane 1302, thus producing outgoing light waves 1316.

Support 1301 may comprise any suitable material having any suitable properties, including any material and/or properties indicated above in reference to support 101 shown in FIG. 1. Membranes 1302 and 1303 may comprise any suitable material having any suitable properties, including any material and/or properties indicated above in reference to membranes 102 and/or 103 shown in FIG. 1. Electrodes 1311A and 1311B may comprise any suitable material having any suitable properties, including any material and/or properties indicated above in reference to electrodes 111A and/or 111B shown in FIG. 1. Actuating elastomer membrane 1315 may comprise any suitable material having any suitable properties, including any material and/or properties indicated above in reference to actuating elastomer membrane 115 shown in FIG. 1. Fluid 1304 may be any suitable fluid, or combination of fluids, including any fluid(s) indicated above in reference to fluid 104 shown in FIG. 1.

An electric field may be applied to electrodes 1311A-B via electrically conductive pathways provided in any suitable way. In some embodiments, conductive wires (not shown) within support 1301 are connected to electrodes 1311A and 1311B and are connected to a power supply outside of the lens. Such conductive wires may be further coupled to support 1301 to provide further stability of the connection, for example via adhesive (which may be elastomeric). As described above, at least one of electrodes 1311A and 1311B may protrude into support 1301, which may aid attachment of said conductive wires to the electrodes.

Membrane 1302 includes a metallic layer configured to reflect light. For example, the metallic layer may be deposed on an exterior wall of membrane 1302. In some embodiments, a reflective metallic coating is applied to membrane 1302 having a thickness between 1 nm and 1 micron. For example, the metallic coating may be applied via evaporation, sputtering, atomic layer deposition, electroplating, electrodeposition, or combinations thereof. The metallic layer may comprise any suitable material or materials such that it is non-reactive with membrane 1302 and reflects incident light.

Figure 14:
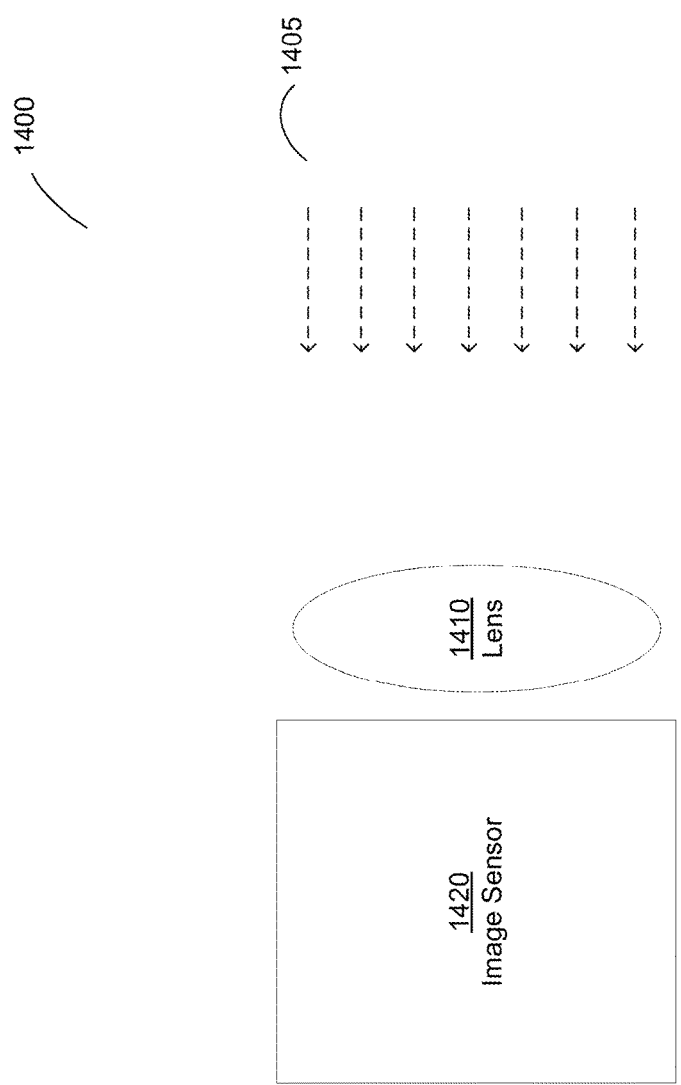
FIG. 14 illustrates a cross-sectional view of an image sensor application utilizing an adaptive lens, according to some embodiments of the present invention.

FIG. 14 illustrates a cross-sectional view of an image sensor application utilizing an adaptive lens, according to some embodiments of the present invention. Image sensor application 1400 may be any suitable device that includes an image sensor, such as a camera. Image sensor application 1400 includes lens 1410 and image sensor 1420. Incoming light 1405 is incident upon the lens 1410, which directs at least a portion of the light toward image sensor 1420.

Lens 1410 may include any suitable embodiments of the adaptive lens described herein, including lens 100 shown in FIG. 1, lens 200 shown in FIG. 2, and lens 600 shown in FIG. 6. However, it will be appreciated that any suitable adaptive lens may be used in image sensor application 1400 such that the lens 1410 directs light toward the image sensor 1420. Lens 1410 may be adapted as described herein to adjust optical properties of the lens such that radiation received by image sensor 1420 is adjusted. For example, lens 1410 may be adapted to increase or decrease the amount of light that the image sensor receives, and/or may adapt the lens to direct incoming light to converge at a particular location within image sensor 1420 (e.g., to focus light on a photodiode).

Image sensor 1420 may be any suitable image sensor, comprising any suitable electronic components necessary for operation of the image sensor application 1400. As non-limiting examples, image sensor 1420 may include: a charge-coupled device (CCD), a complementary metal-oxide-semiconductor (CMOS) sensor, or combinations thereof. Moreover, image sensor 1420 may include components such as color filters (e.g., a Bayer filter), conductors, insulators, wiring, anti-reflective layers, or combinations thereof. In general, image sensor 1420 may comprise any device that converts incident light into an electrical signal, and may be of any suitable design (e.g., front-illuminated sensor, back-illuminated sensor, etc.).

Having herein described several embodiments, several advantages of embodiments of the present application should be apparent. One advantage is that embodiments may allow for a compact and adaptable lens suitable for a wide variety of imaging and/or acoustic applications. A non-limiting list of applications for which embodiments described herein may be used include image sensors, cameras, endoscopes, machine vision applications, phased arrays, lasers, lenslet arrays, lithotripsy, medical imaging, ultrasound, dichroic filters and/or minors, and combinations thereof.

Medical endoscopes are designed with minimal insertion diameters to minimize discomfort during use. As an exemplary application, embodiments of an adaptive lens described herein may be used to reduce the insertion diameter of an endoscope with concomitant retention of highly variable focusing capabilities and high image quality. Conventional endoscopes may utilize a pair of lenses in series and may adjust their relative distances using a driver to vary the focal length. Embodiments of the adaptive lens described herein may replace bulky drivers external to the lens in a conventional endoscope with an extremely compact transparent lens.

Alternatively, or additionally, aspects of an adaptive lens described herein may be used in an adaptive dichroic filter and/or adaptive dichroic minor. For example, an adaptive band-pass filter may be constructed by coupling a diffraction grating to one or more actuated membranes as described herein attached to a rigid frame. In such a filter, incident light may be diffracted by the diffraction grating, for example to reflect some light rays while transmitting others (e.g., particular ranges of wavelengths may be transmitted while other wavelengths are reflected, resulting in a color filter). In addition, embodiments described herein may provide for the actuation of the membrane coupled to the diffraction grating such that one or more optical properties of the filter may be adapted.

In addition, aspects of the adaptive lens described herein may be used in medical acoustic applications, for example extracorporeal shockwave lithotripsy which directs acoustic energy into a kidney stone to break up the stone within the body. During the procedure when using conventional acoustic sources, a patient typically has to move multiple times to reposition the acoustic wave source. However, embodiments of the adaptive lens described herein may allow for greater flexibility of the treatment apparatus by providing greater directionality of the produced acoustic waves.

Alternatively, or additionally, aspects of the adaptive lens described herein may be used in medical imaging applications, including high intensity focused ultrasound (HIFU). HIFU is a technique for focusing acoustic radiation onto a volume of tissue such that the tissue is scarred or destroyed (e.g., to remove a tumor or cauterize tissue). Some embodiments of the adaptive lens described herein may be used to provide focus control of a high intensity ultrasound source during a HIFU procedure. For example, an adaptive lens may be used to direct potentially damaging radiation away from healthy tissue of a patient, and toward the tissue being targeted by the procedure. Suitable HIFU power levels may include 50-200 W (e.g., 100 W) at frequencies between 1-5 MHz (e.g., 3 MHz), and may be directed over any suitable area, such as an area between 1 mm² and 10 mm² in size. Aspects of the adaptive lens described herein may be used with or without a coupling medium (e.g., ultrasound gel).

Alternatively, or additionally, aspects of the adaptive lens described herein may be used for photoacoustic spectroscopy, including for photoacoustic imaging. In photoacoustic spectroscopy, the effect of absorbed electromagnetic energy by matter is observed by measuring acoustic energy produced as a result of the absorption. Aspects of the adaptive lens described herein may be applied to the application of electromagnetic energy to matter and/or to the receiving of acoustic energy from matter, wherein one or both relates to photoacoustic spectroscopy. For example, aspects of the adaptive lens described herein may be applied to photoacoustic imaging, such as biomedical photoacoustic imaging. In some embodiments, acoustic waves produced during photoacoustic imaging may be incident upon an adaptive lens, which may for example aid the collection of an acoustic signal. In some embodiments, electromagnetic waves are incident upon a suitable adaptive lens during photoacoustic imaging, for example to focus the waves at a target material. Aspects of the adaptive lens described herein may exhibit particular advantages over conventional lenses for photoacoustic imaging, including impedance matching with the human body (as described above), higher resolution, and/or a faster raster scan of a target in 3-dimensions.

It should be appreciated that the adaptive lens described herein may have any suitable dimensions, and embodiments of the adaptive lens are not limited to those dimensions indicated above. For example, an adaptive lens may have a diameter ranging from 1 mm to 1 m. In some embodiments, an adaptive lens may have a diameter between 1 cm and 5 cm, such as 2 cm. In some embodiments, an adaptive lens may have a diameter of approximately 1 cm. Dimensions of membranes indicated above are similarly not limiting and any suitable diameter and/or thickness of membranes may be used in an adaptive lens. For example, the diameter of a membrane may range from 1 mm to 1 m. In some embodiments, one or more membranes of an adaptive lens may have a diameter between 5 mm and 10 cm, such as 4 cm. In some embodiments, the thickness of one or more membranes of an adaptive lens is between 10 microns and 1 mm, such as 50 microns.

It should be appreciated that aspects of the adaptive lens described herein may include any suitable volume of fluid, and that any number of different fluids of various volumes may be included in an adaptive lens. In some embodiments, an adaptive lens comprises between 0.1 cm³ and 1000 cm³, for example 2 cm³.

It should be appreciated that aspects of the adaptive lens described herein may be used with any suitable wavelength of electromagnetic radiation, and may be used with any type or types of radiation including radio waves, microwaves, infrared (including near-infrared), visible light, ultraviolet, x-rays, gamma rays, and combinations thereof. The various methods and structures described herein may refer to "light waves"; it should be appreciated that this term is not limited to visible light waves and may include electromagnetic radiation from any region or regions of the electromagnetic spectrum, as the adaptive lens described herein is not limited for use with visible light.

The term "optical" as used herein encompasses aspects of the electromagnetic spectrum not limited to visible light, and may include any suitable region or regions of the electromagnetic spectrum. For example, an optical property of aspects of an adaptive lens described herein may include the adaptive lens' response to x-rays. The terms "transparent" and/or "transmittance" as used herein are not necessarily limited to transmittance of visible light, and may refer to a degree of transmission of electromagnetic energy from any portion of portions of the electromagnetic spectrum. For example, in some embodiments, an adaptive lens may be substantially transparent to x-rays.

It should be appreciated that aspects of the adaptive lens described herein may be used with any suitable type of acoustic wave, including any mechanical wave present in any suitable medium (including solids, liquids and/or gases) and at any suitable frequency. Non-limiting examples of types of acoustic waves suitable for use with aspects of the adaptive lens described herein include: sound waves in air, ultrasonic waves (e.g., in air, in the human body), sound waves in water (e.g., sonar), infrasound (e.g., less than 20 Hz), and combinations thereof. In some embodiments, infrasound waves may be used with an adaptive lens, with or without a suitable coupling medium. For example, such an embodiment may be used to detect low frequency sounds such as emitted by seismic activity (e.g., earthquakes and/or tremors) or animals such as whales.

The various methods and structures outlined herein may be implemented using any suitable materials. While particular materials and methods are described above, the methods and structures can be readily implemented using any combination of materials having suitable properties for practicing embodiments of the invention described herein.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. An adaptive lens comprising:
at least one fluid-filled chamber located within an optical and/or acoustic path of the lens; and
at least one elastomeric and substantially optically and/or acoustically transparent membrane, located within an optical and/or acoustic path of the lens and at least partially bounding one or more of the at least one fluid-filled chambers,
wherein one or more of the at least one membranes is configured such that application of an electric field to the membrane within the optical and/or acoustic path of the lens alters a shape of the membrane by actuating the membrane within the optical and/or acoustic path.

2. The adaptive lens, as claimed in claim 1, further including substantially optically and/or acoustically transparent electrodes that apply the electric field to the membrane.

3. The adaptive lens, as claimed in claim 2, wherein the electrodes comprise carbon nanotubes.

4. The adaptive lens, as claimed in claim 2, wherein at least one of the electrodes comprises a plurality of electrode areas arranged in a pattern.

5. The adaptive lens, as claimed in claim 1, wherein the least one membrane includes a plurality of membranes, and wherein each of the plurality of membranes at least partially bounds one or more of the at least one fluid-filled chambers.

6. The adaptive lens, as claimed in claim 5, wherein the at least one fluid-filled chamber includes two fluid-filled chambers, and wherein the plurality of membranes includes at least one membrane that at least partially bounds each of the two fluid-filled chambers.

7. A plurality of lenses, arranged in an array, each lens as claimed in claim 1.

8. The adaptive lens, as claimed in claim 1, wherein the fluid is substantially optically and/or acoustically transparent.

9. The adaptive lens, as claimed in claim 8, wherein the fluid comprises silicone oil.

10. An adaptive mirror comprising:
at least one fluid-filled chamber located within an optical and/or acoustic path of the mirror; and
at least one elastomeric and substantially optically and/or acoustically transparent membrane, located within an optical and/or acoustic path of the mirror and at least partially bounding one or more of the at least one fluid-filled chambers,
wherein one or more of the at least one membranes is configured such that application of an electric field to the membrane within the optical and/or acoustic path of the lens alters a shape of the membrane by actuating the membrane within the optical and/or acoustic path.

11. A method of producing a lens comprising:
providing at least one chamber bounded at least in part by first and second membranes; and providing a fluid into the at least one chamber such that the fluid is located within an optical and/or acoustic path of the lens,
wherein at least one of the first and second membranes is elastomeric, substantially optically and/or acoustically transparent, within an optical and/or acoustic path of the lens, and configured such that application of an electric field to the membrane within the optical and/or acoustic path of the lens alters a shape of the membrane by actuating the membrane within the optical and/or acoustic path.

12. The method of producing the lens, as claimed in claim 11, further including providing substantially optically and/or acoustically transparent electrodes that supply the electric field to the membrane.

13. The method of producing the lens, as claimed in claim 12, wherein the electrodes comprise carbon nanotubes.

14. The method of producing the lens, as claimed in claim 12, further including patterning at least one electrode into a plurality of electrode areas.

15. Arranging a plurality of lenses into an array, each lens produced according to claim 11.

16. A method of producing a lens comprising:
deforming a first membrane such that a cavity is produced in the first membrane;
providing a fluid into the cavity;
coupling a second membrane to the first membrane, thereby forming a chamber comprising the fluid,
wherein at least one of the first and second membranes is elastomeric, substantially optically and/or acoustically transparent, within an optical and/or acoustic path of the lens, and configured such that application of an electric field to the membrane within the optical and/or acoustic path of the lens alters a shape of the membrane by actuating the membrane within the optical and/or acoustic path.

17. The method of producing the lens, as claimed in claim 16, further including providing substantially optically and/or acoustically transparent electrodes that supply the electric field to the membrane.

18. The method of producing the lens, as claimed in claim 17, wherein the electrodes comprise carbon nanotubes.

19. The method of producing the lens, as claimed in claim 17, further including patterning at least one electrode into a plurality of electrode areas.

20. Arranging a plurality of lenses into an array, each lens produced according to claim 16.

* * * * *